(12) United States Patent
Hirukawa et al.

(10) Patent No.: US 9,551,382 B2
(45) Date of Patent: Jan. 24, 2017

(54) FIXED TYPE CONSTANT VELOCITY UNIVERSAL JOINT

(71) Applicants: Hiroyasu Hirukawa, Shizuoka (JP); Teruaki Fujio, Shizuoka (JP); Kenta Yamazaki, Shizuoka (JP)

(72) Inventors: Hiroyasu Hirukawa, Shizuoka (JP); Teruaki Fujio, Shizuoka (JP); Kenta Yamazaki, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/439,901

(22) PCT Filed: Oct. 10, 2013

(86) PCT No.: PCT/JP2013/077654
§ 371 (c)(1),
(2) Date: Apr. 30, 2015

(87) PCT Pub. No.: WO2014/069210
PCT Pub. Date: May 8, 2014

(65) Prior Publication Data
US 2015/0316108 A1    Nov. 5, 2015

(30) Foreign Application Priority Data

Nov. 5, 2012    (JP) .................................. 2012-243710

(51) Int. Cl.
*F16D 3/224* (2011.01)
*F16D 3/223* (2011.01)
(Continued)

(52) U.S. Cl.
CPC ............. *F16D 3/223* (2013.01); *F16D 3/2233* (2013.01); *F16D 3/2245* (2013.01); *F16D 2003/22309* (2013.01); *Y10S 464/906* (2013.01)

(58) Field of Classification Search
CPC ...... F16D 3/223; F16D 3/2245; F16D 3/2233; F16D 2003/22309; Y10S 464/906
(Continued)

(56) References Cited

U.S. PATENT DOCUMENTS 5,853,328 A   12/1998   Kobayashi et al.
6,227,979 B1   5/2001   Yamamoto et al.
(Continued)

FOREIGN PATENT DOCUMENTS

CN   102575720       7/2012
JP   3-61720 A   *   3/1991
(Continued)

OTHER PUBLICATIONS

International Search Report issued Nov. 12, 2013 in International (PCT) Application No. PCT/JP2013/077654.
(Continued)

*Primary Examiner* — Gregory Binda
(74) *Attorney, Agent, or Firm* — Wenderoth, Lind & Ponack, L.L.P.

(57) ABSTRACT

Provided is a fixed type constant velocity universal joint, in which: each of first track groove portions positioned on an interior side of an outer joint member includes an arc part having a curvature center that is positioned without being offset in an axial direction with respect to a joint center; the first track groove portions are inclined in a peripheral direction with respect to a joint axial line (N-N) and adjacent to each other in the peripheral direction with their inclination directions opposite to each other; each of second track groove portions positioned on an opening side is formed into a different shape from a shape of the each of the first track groove portions so as to increase an effective track length at a maximum operating angle; the each of the first track groove portions and the each of the second track groove (Continued)

portions are connected to each other at a position on the opening side with respect to the joint center; each of track grooves of an inner joint member is formed so as to be mirror-image symmetrical with corresponding one of paired track grooves of the outer joint member with respect to a plane including the joint center and being perpendicular to the joint axial line at an operating angle of 0°; and an axial clearance between the inner joint member and a cage is set to be larger than an axial clearance corresponding to a clearance between each of balls and each of the track grooves.

12 Claims, 27 Drawing Sheets

(51) Int. Cl.
   *F16D 3/2233* (2011.01)
   *F16D 3/2245* (2011.01)

(58) Field of Classification Search
   USPC .......................................................... 464/144
   See application file for complete search history.

(56) References Cited

U.S. PATENT DOCUMENTS

| 6,468,164 | B2* | 10/2002 | Song | F16D 3/2237 |
| | | | | 464/144 |
| 7,112,140 | B2 | 9/2006 | Weckerling | |
| 9,169,877 | B2* | 10/2015 | Hirukawa | F16D 3/2233 |
| 9,255,611 | B2* | 2/2016 | Fujio | F16D 3/2245 |
| 2001/0046900 | A1 | 11/2001 | Song | |
| 2004/0137991 | A1 | 7/2004 | Weckerling | |
| 2011/0212789 | A1 | 9/2011 | Ooba et al. | |
| 2012/0165105 | A1 | 6/2012 | Fujio et al. | |
| 2014/0038733 | A1 | 2/2014 | Fujio et al. | |

FOREIGN PATENT DOCUMENTS

| JP | 9-280261 | 10/1997 |
| JP | 11-236927 | 8/1999 |
| JP | 2009-250365 | 10/2009 |
| JP | 2010-133442 | 6/2010 |
| JP | 2010-133444 | 6/2010 |
| JP | 4904356 | 3/2012 |
| WO | 01/61203 | 8/2001 |
| WO | 2007/028435 | 3/2007 |

OTHER PUBLICATIONS

International Preliminary Report on Patentability and Written Opinion of the International Searching Authority issued May 5, 2015 in International (PCT) Application No. PCT/JP2013/077654.
Extended European Search Report issued Jul. 21, 2016 in corresponding European Application No. 13851860.0.
First Office Action issued Oct. 8, 2016 in corresponding Chinese Application No. 201380057290.7, with partial English translation.

* cited by examiner

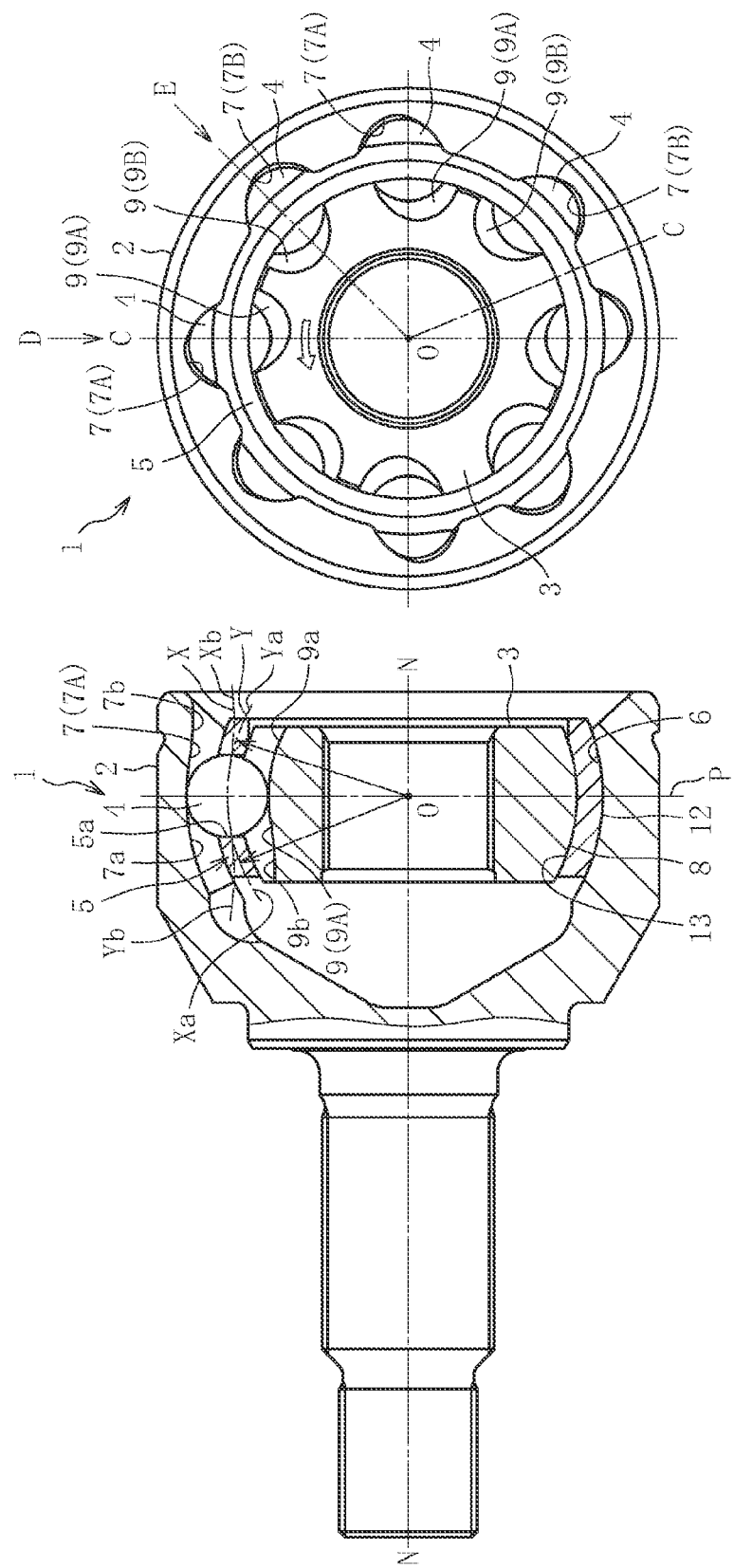

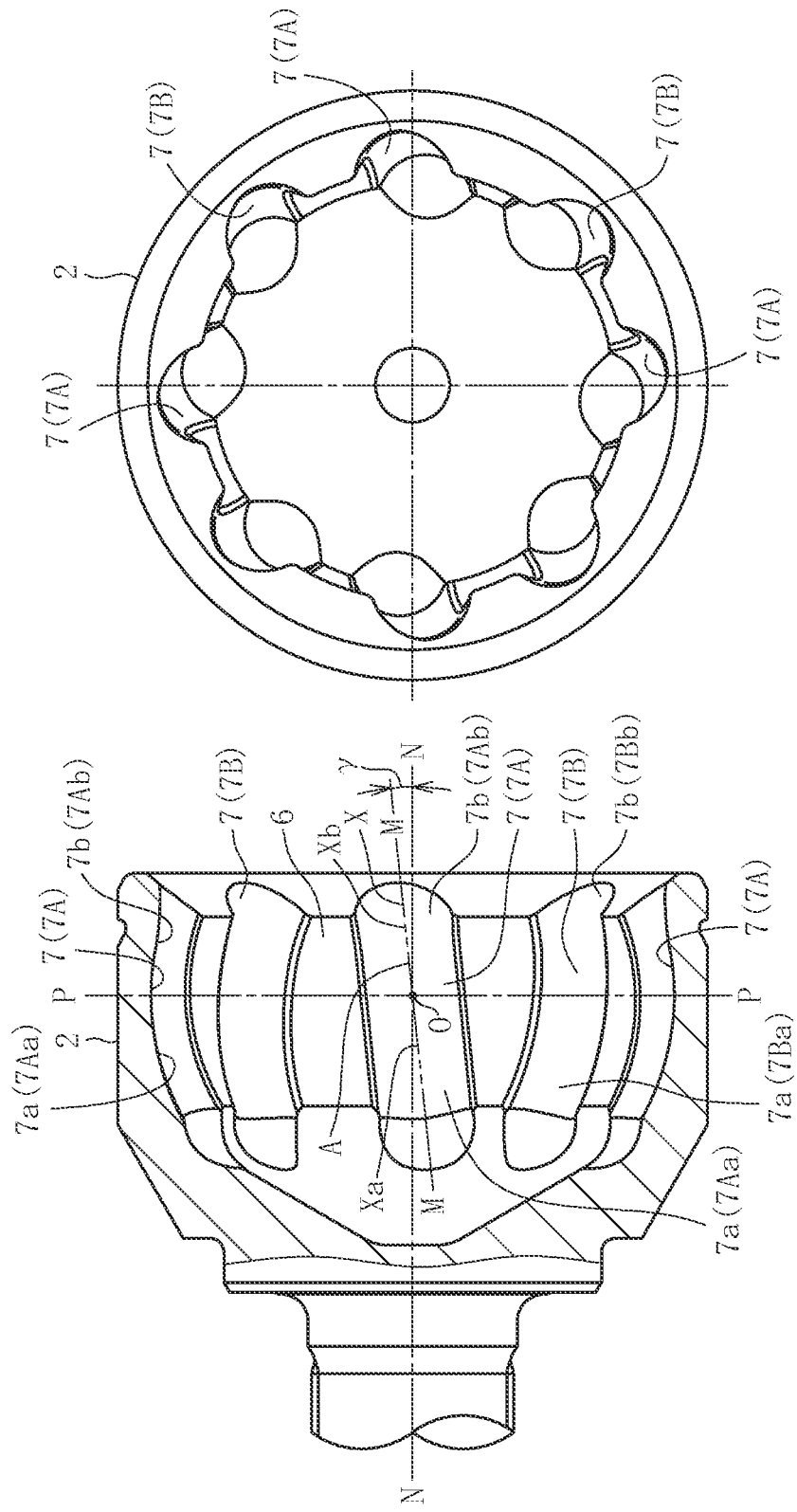

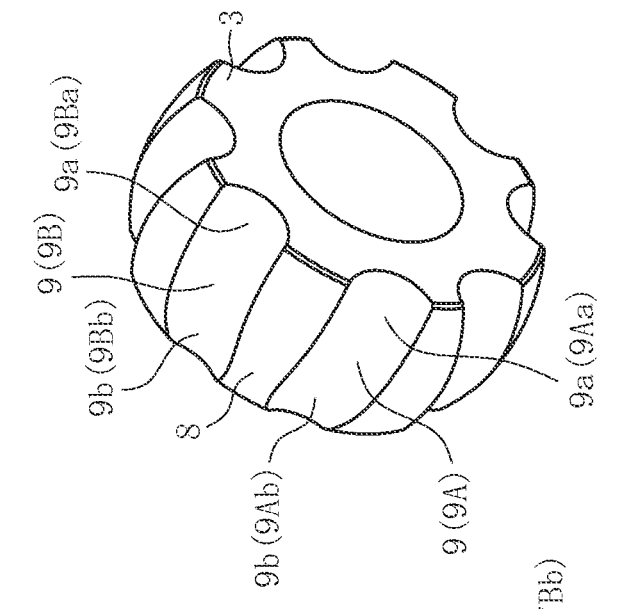
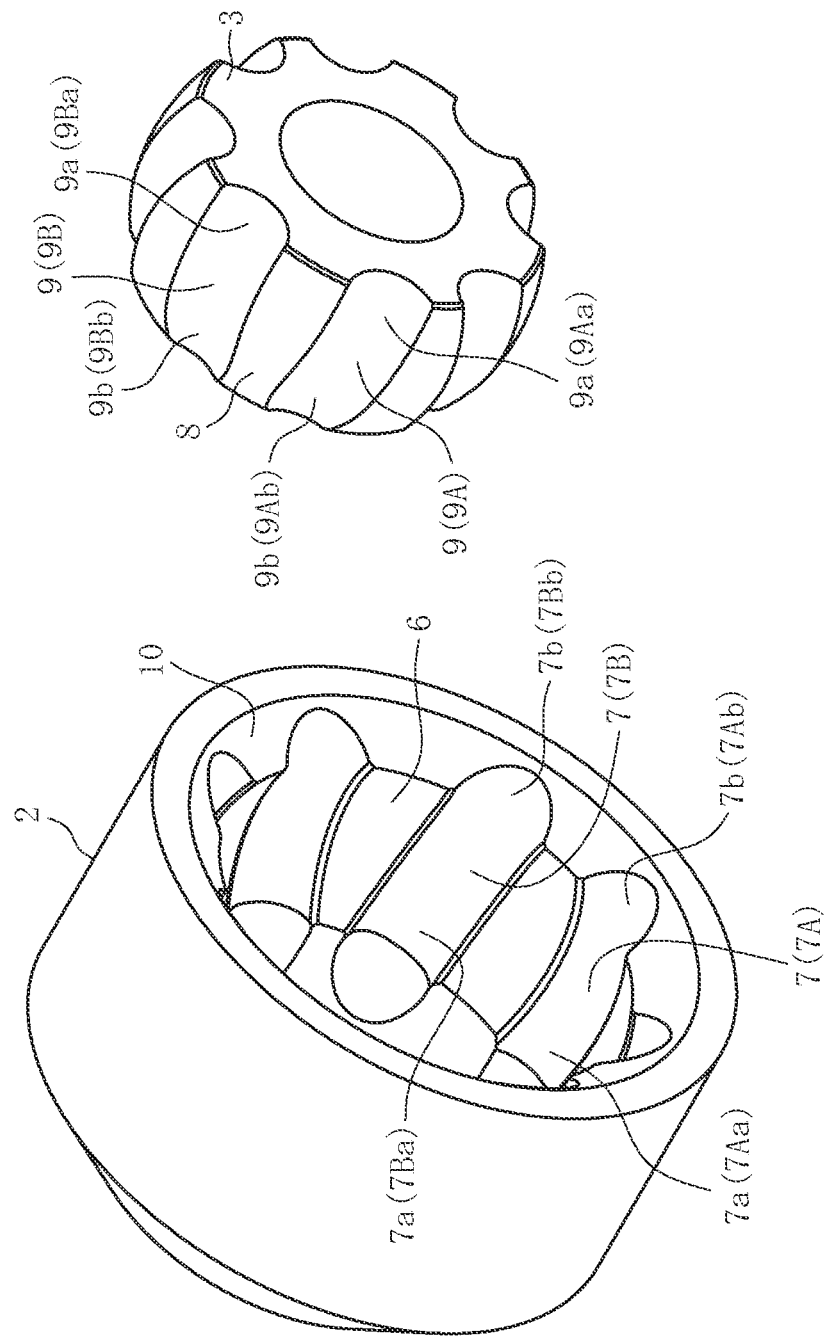
Fig. 12a
Fig. 12b

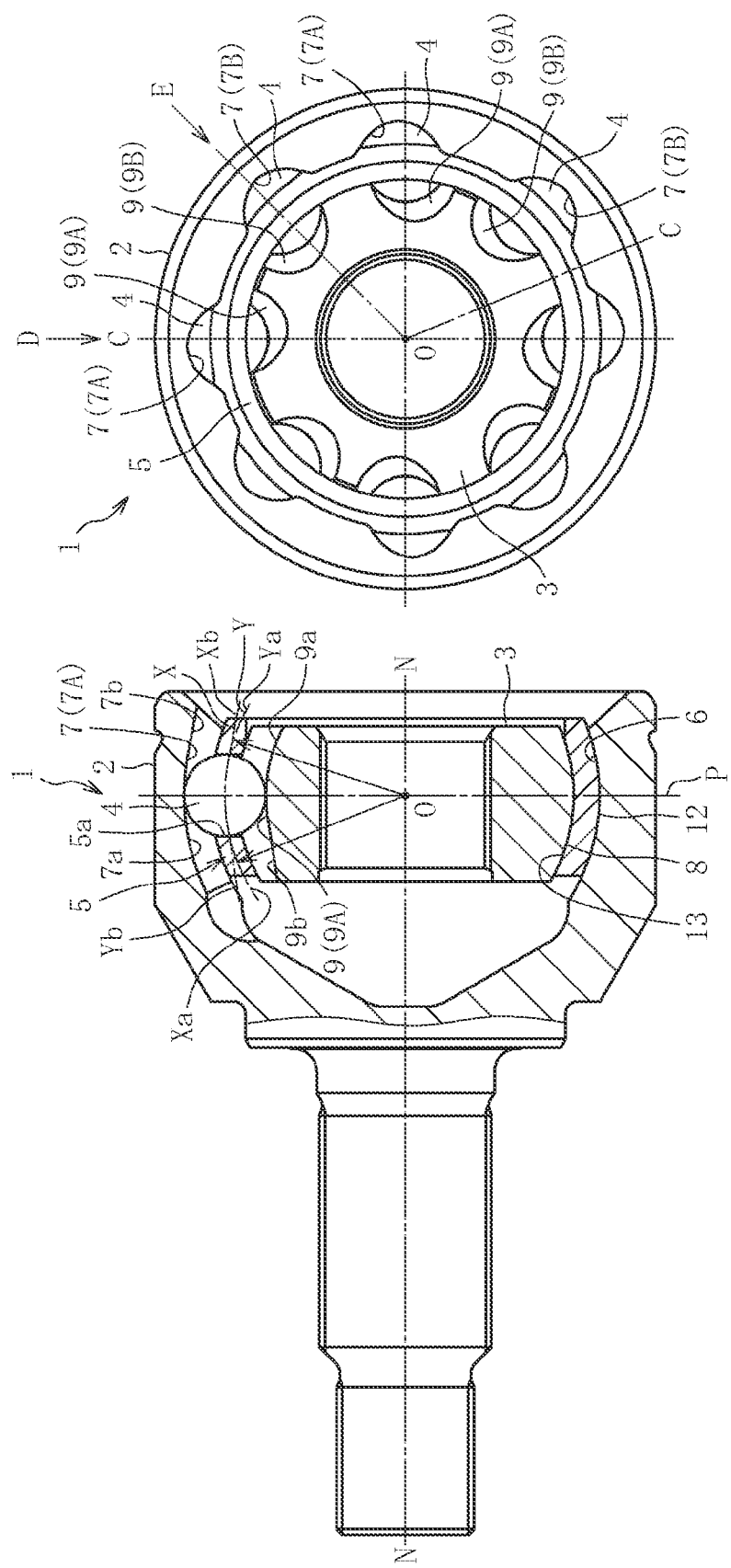

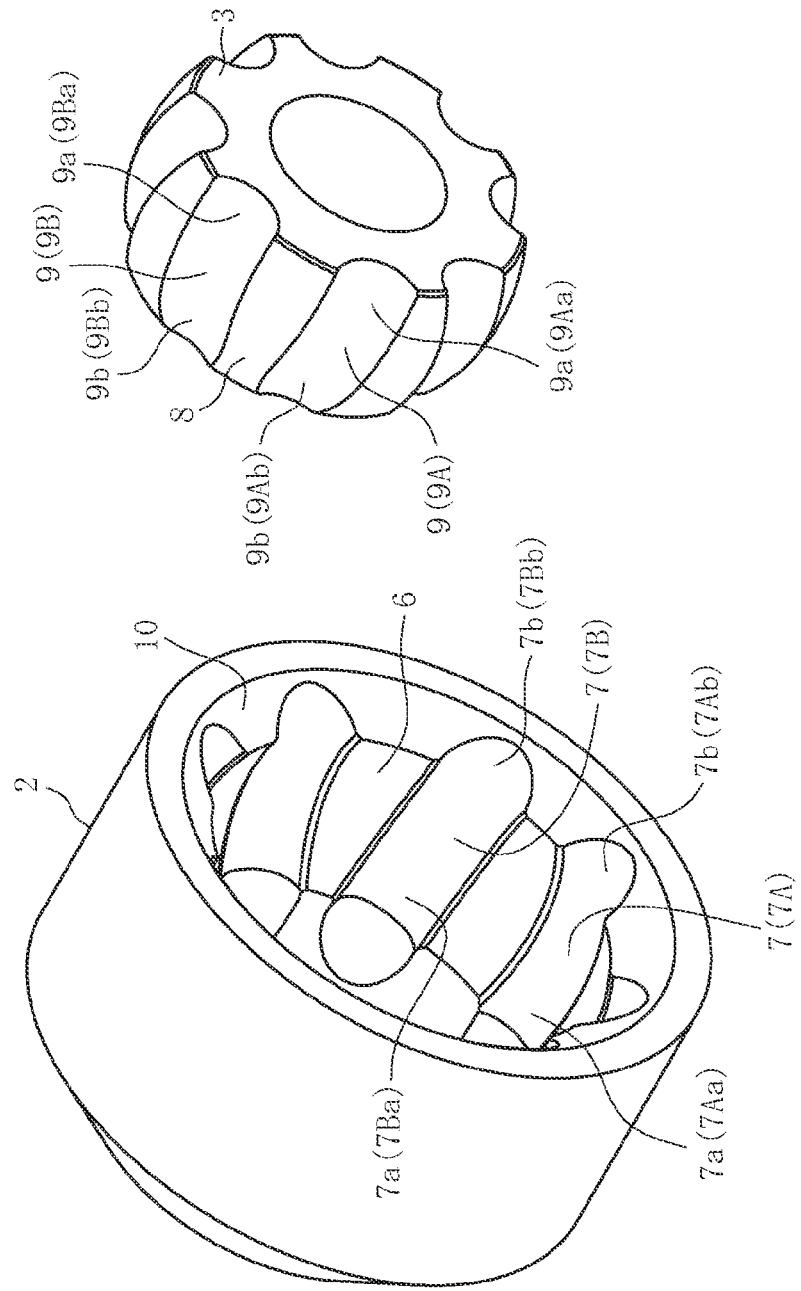

FIXED TYPE CONSTANT VELOCITY
UNIVERSAL JOINT

TECHNICAL FIELD

The present invention relates to a fixed type constant velocity universal joint, and more specifically, to a fixed type constant velocity universal joint to be used in a power transmission system of automobiles and various industrial machines, for allowing only angular displacement between two shafts on a driving side and a driven side.

BACKGROUND ART

For example, a plunging type constant velocity universal joint that is axially displaceable while forming an operating angle but forms a relatively small maximum operating angle is generally assembled on an inboard side (differential side) of an automotive front drive shaft. Further, a fixed type constant velocity universal joint that can form a large operating angle but is not axially displaceable is generally assembled on an outboard side (wheel side) of the automotive front drive shaft because the wheel is steered on the outboard side.

FIGS. 27a and 27b illustrate a Rzeppa type constant velocity universal joint 101 as an example of the fixed type constant velocity universal joint that is used on the outboard side. FIG. 27a is a vertical sectional view of a state at an operating angle of 0°, and FIG. 27b is a schematic view of a state in which a maximum operating angle is formed. As illustrated in FIG. 27a, the constant velocity universal joint 101 mainly includes an outer joint member 102, an inner joint member 103, balls 104, and a cage 105. Eight track grooves 107 are formed equiangularly in a spherical inner peripheral surface 106 of the outer joint member 102 so as to extend along an axial direction. Track grooves 109 opposed to the track grooves 107 of the outer joint member 102 are formed equiangularly in a spherical outer peripheral surface 108 of the inner joint member 103 so as to extend along the axial direction. Eight balls 104 for transmitting torque are interposed between the track grooves 107 of the outer joint member 102 and the track grooves 109 of the inner joint member 103. The cage 105 for holding the balls 104 is arranged between the spherical inner peripheral surface 106 of the outer joint member 102 and the spherical outer peripheral surface 108 of the inner joint member 103. An outer periphery of the outer joint member 102 and an outer periphery of a shaft coupled to the inner joint member 103 are covered with a boot, and grease is sealed inside the joint as a lubricant (not shown).

As illustrated in FIG. 27a, the cage 105 has a spherical outer peripheral surface 112 fitted to the spherical inner peripheral surface 106 of the outer joint member 102, and a spherical inner peripheral surface 113 fitted to the spherical outer peripheral surface 108 of the inner joint member 103. The spherical outer peripheral surface 112 and the spherical inner peripheral surface 113 each have a curvature center formed at a joint center O. On the other hand, a curvature center Oo of a ball raceway center line x of each track groove 107 of the outer joint member 102 and a curvature center Oi of a ball raceway center line y of each track groove 109 of the inner joint member 103 are offset to both sides in the axial direction by equal distances with respect to the joint center O. Therefore, when the joint forms an operating angle, the balls 104 are always guided in a plane bisecting an angle formed between axial lines of the outer joint member 102 and the inner joint member 103. As a result, rotational torque is transmitted at a constant velocity between the two axes.

As illustrated in FIG. 27b, a maximum operating angle $\theta_{max}$, which is defined as a main function of the fixed type constant velocity universal joint 101, depends on an angle causing interference between an inlet chamfer 110 formed at an opening rim of the outer joint member 102 and a shaft 111. In order to secure permissible torque to be transmitted, an axial diameter d of the shaft 111 is determined for each joint size. When a large inlet chamfer 110 is formed, the length of each track groove 107 of the outer joint member 102, on which the ball 104 is brought into contact (hereinafter referred to as "effective track length"), is insufficient. As a result, the ball 104 may drop off the track groove 107, and the rotational torque cannot be transmitted. Therefore, how the inlet chamfer 110 is formed while securing the effective track length of the outer joint member 102 is an important factor in securing the operating angle. In the Rzeppa type constant velocity universal joint 101, the curvature center Oo of the ball raceway center line x of the track groove 107 of the outer joint member 102 is offset to an opening side. Thus, there is an advantage in terms of the maximum operating angle, and the maximum operating angle $\theta_{max}$ is approximately 47°.

Further, as compared to a related-art constant velocity universal joint of a six ball type, the Rzeppa type constant velocity universal joint 101 of the eight ball type has a smaller track offset amount, a larger number of balls, and has a smaller diameter. Thus, it is possible to attain a highly efficient constant velocity universal joint that is lightweight and compact, and is suppressed in torque loss. However, as illustrated in FIG. 28, at an operating angle of 0°, wedge angles α formed between the opposed track grooves 107 and 109 of the outer joint member 102 and the inner joint member 103 (as illustrated in FIG. 28, the contact points between the ball 104 and the track grooves 107 and 109 are positioned on the broken lines) are opened toward the opening side of the outer joint member 102. Therefore, due to axial force G applied from the track grooves 107 and 109 to the balls 104, loads to be applied to the spherical contact portions 106 and 112 of the outer joint member 102 and the cage 105 and the spherical contact portions 108 and 113 of the inner joint member 103 and the cage 105 are generated in a certain direction. In this structure, as illustrated in FIG. 28, the outer joint member 102 and the cage 105 are held in contact with each other at a part J, and the inner joint member 103 and the cage 105 are held in contact with each other at a part I, which leads to restriction on achieving even higher efficiency and less heat generation.

In order to achieve even higher efficiency and less heat generation than those of the above-mentioned Rzeppa type constant velocity universal joint 101 of the eight ball type, a fixed type constant velocity universal joint of a track groove crossing type has been proposed (Patent Document 1). FIGS. 29, 30a and 30b illustrate the constant velocity universal joint of this type. FIG. 29 is a vertical sectional view at an operating angle of 0°, FIG. 30a is a view at a high operating angle, and FIG. 30b is an enlarged view of a main part of FIG. 30a. As illustrated in FIG. 29, a constant velocity universal joint 121 mainly includes an outer joint member 122, an inner joint member 123, balls 124, and a cage 125. Although illustration is omitted, in the constant velocity universal joint 121 of the track groove crossing type, planes including ball raceway center lines x of eight track grooves 127 of the outer joint member 122 are inclined with respect to a joint axial line n-n with their inclination directions opposite to each other in the track grooves 127 adjacent to each other in a peripheral direction. In addition, each track groove 129 of the inner joint member 123 has a ball raceway center line y, which is formed so as to be mirror-image symmetrical with the ball raceway center line x of the paired track groove 127 of the outer joint member 122 with respect to a plane P including a joint center O and being perpendicular to the joint axial line n-n at the operating angle of 0°.

In the vertical cross section illustrated in FIG. 29, each track groove 127 formed in a spherical inner peripheral surface 126 of the outer joint member 122 extends into an arc shape along the axial direction, and a curvature center of the track groove 127 is positioned at the joint center O. Each track groove 129 formed in a spherical outer peripheral surface 128 of the inner joint member 123 so as to be opposed to the track groove 127 of the outer joint member 122 extends into an arc shape along the axial direction, and a curvature center of the track groove 129 is positioned at the joint center O. Eight balls 124 for transmitting torque are interposed in crossing portions between the track grooves 127 of the outer joint member 122 and the track grooves 129 of the inner joint member 123. The cage 125 for holding the balls 124 is arranged between the spherical inner peripheral surface 126 of the outer joint member 122 and the spherical outer peripheral surface 128 of the inner joint member 123. The cage 125 has a spherical outer peripheral surface 132 fitted to the spherical inner peripheral surface 126 of the outer joint member 122, and a spherical inner peripheral surface 133 fitted to the spherical outer peripheral surface 128 of the inner joint member 123. The spherical outer peripheral surface 132 and the spherical inner peripheral surface 133 each have a curvature center formed at the joint center O. In the constant velocity universal joint 121, curvature centers of the ball raceway center lines x and y of the track grooves 127 and 129 of the outer joint member 122 and the inner joint member 123 are not offset in the axial direction with respect to the joint center O. However, the inclined opposed track grooves 127 and 129 cross each other, and the balls 124 are interposed in those crossing portions. Therefore, when the joint forms an operating angle, the balls 124 are always guided in a plane bisecting an angle formed between axial lines of the outer joint member 122 and the inner joint member 123. As a result, rotational torque is transmitted at a constant velocity between the two axes.

In the above-mentioned fixed type constant velocity universal joint 121 of the track groove crossing type, the track grooves 127 of the outer joint member 122 that are adjacent to each other in the peripheral direction are inclined in the opposite directions. Further, the track grooves 129 of the inner joint member 123 that are adjacent to each other in the peripheral direction are inclined in the opposite directions. Therefore, forces in the opposite directions are applied from the balls 124 to pocket portions 125a of the cage 125 that are adjacent to each other in the peripheral direction. Due to the forces in the opposite directions, the cage 125 is stabilized at the position of the joint center O. Thus, a contact force between the spherical outer peripheral surface 132 of the cage 125 and the spherical inner peripheral surface 126 of the outer joint member 122, and a contact force between the spherical inner peripheral surface 133 of the cage 125 and the spherical outer peripheral surface 128 of the inner joint member 123 are suppressed. Accordingly, the joint is smoothly operated under high load and in high speed rotation. As a result, torque loss and heat generation are suppressed, and the durability is enhanced.

The above-mentioned fixed type constant velocity universal joint 121 is excellent as a joint suppressed in heat generation, but has the following problem inherent therein. Detailed description is given of the problem with reference to FIGS. 30a and 30b. FIG. 30a illustrates a state in which the above-mentioned constant velocity universal joint forms a high operating angle, and FIG. 30b illustrates a positional relationship between the track groove 127 of the outer joint member 122 and the ball 124 on an enlarged scale. As illustrated in FIG. 30a, when the joint forms a high operating angle θ, a center Ob of the ball 124 moves to a position of θ/2 with respect to the plane P including the joint center O and being perpendicular to the joint axial line n-n at the operating angle of 0°. The ball 124 and the track groove 127 are held in angular contact at a contact angle, and hence a contact point between the ball 124 and the track groove 127 is positioned on the broken line in FIG. 30b. In addition, in the axial direction, the contact point between the ball 124 and the track groove 127 is positioned in a plane t that passes through the center Ob of the ball 124 and is orthogonal to the ball raceway center line x. In the above-mentioned fixed type constant velocity universal joint 121, when a large inlet chamfer 130 is formed in the outer joint member 122, the ball 124 comes to a position on an outside of the inlet chamfer 130 at a high operating angle θ, and may drop off the track groove 127. This is because the effective track length becomes insufficient. Specifically, the curvature center of the arc-shaped track groove 127 and the joint center O match with each other, and hence an axial distance w between the center Ob of the ball 124 and a contact point s is large. As a result, there arises a problem that high operating angles cannot be formed.

Further, Patent Document 2 discloses a counter track type constant velocity universal joint, in which axial plays are formed to allow relative movement in the axial direction between an outer joint member and a cage, and between the cage and an inner joint member.

PRIOR ART DOCUMENTS

Patent Documents

Patent Document 1: JP 2009-250365 A
Patent Document 2: JP 4904356 B2

SUMMARY OF THE INVENTION

Problems to be Solved by the Invention

In view of the above-mentioned problem with the related art, the inventors have investigated the possibility of forming the track grooves into a straight shape on the opening side with respect to the joint center O so as to achieve high operating angles in the fixed type constant velocity universal joint of the track groove crossing type as disclosed in Patent Document 1. FIGS. 25a and 25b illustrate this constant velocity universal joint. FIG. 25a is a vertical sectional view, and FIG. 25b is a right-hand side view of FIG. 25a. As illustrated in FIG. 25a, in a constant velocity universal joint 141, track grooves 147 and 149 of an outer joint member 142 and an inner joint member 143 are of a crossing type. Each track groove 147 of the outer joint member 142 includes a track groove portion 147a having an arc-shaped ball raceway center line xa about a curvature center at the joint center O on an interior side with respect to the joint center O, and a track groove portion 147b having a straight ball raceway center line xb on an opening side with respect to the joint center O. On the other hand, each track groove 149 of the inner joint member 143 includes a track groove portion 149*b* having a straight ball raceway center line yb on the interior side with respect to the joint center O, and a track groove portion 149*a* having an arc-shaped ball raceway center line ya about a curvature center at the joint center O on the opening side with respect to the joint center O.

In addition, as illustrated in FIG. 25*b*, the track grooves 147 include track grooves 147A and 147B that are inclined in a peripheral direction with respect to a joint axial line and adjacent to each other in the peripheral direction with their inclination directions opposite to each other. Further, the track grooves 149 include track grooves 149A and 149B that are inclined in the peripheral direction with respect to the joint axial line and adjacent to each other in the peripheral direction with their inclination directions opposite to each other. Balls 144 are arranged in crossing portions of the paired track grooves 147A and 149A and the paired track grooves 147B and 149B of the outer joint member 142 and the inner joint member 143. Thus, when torque is transmitted at the operating angle of 0° as illustrated in FIGS. 25*a* and 25*b*, an opening direction of a wedge angle formed between the track grooves 147A and 149A and an opening direction of a wedge angle formed between the track grooves 147B and 149B become opposite to each other, and hence forces in the opposite directions are applied from the balls 144 to pocket portions 145*a* of a cage 145 that are adjacent to each other in the peripheral direction. With the forces in the opposite directions, the cage 145 is stabilized at the position of the joint center O. Thus, a contact force between a spherical outer peripheral surface 152 of the cage 145 and a spherical inner peripheral surface 146 of the outer joint member 142, and a contact force between a spherical inner peripheral surface 153 of the cage 145 and a spherical outer peripheral surface 148 of the inner joint member 143 are suppressed. Accordingly, the joint is smoothly operated under high load and in high speed rotation. As a result, torque loss and heat generation are suppressed, and the durability is enhanced.

As described above, in the track groove crossing type, the straight track groove portion 147*b* is formed on the opening side with respect to the joint center O in the track groove 147 of the outer joint member 142. With this, the effective track length can be increased. However, it has been found that, when a frequently used operating angle is formed, there is a problem in terms of suppression of the torque loss and heat generation of the joint. The reason is described with reference to FIG. 26. The track grooves 147 and 149 are generally held in contact with each ball 144 at a contact angle (approximately from 30° to 45°), and hence, as illustrated in FIG. 26, the track grooves 147 and 149 are held in contact with the ball 144 at positions indicated by the broken lines on side surface sides of the track grooves 147 and 149, which are slightly spaced apart from groove bottoms of the track grooves 147 and 149. When the joint forms an operating angle, wedge angle components (not shown) due to the crossing between the track grooves 147 and 149 and wedge angle components $\alpha$ due to expansion between the groove bottoms of the track grooves 147 and 149 in a radial direction of the joint are both applied to the balls 144. Of those wedge angle components, the wedge angle components due to the crossing between the track grooves 147 and 149 are canceled and forces are balanced because the track grooves 147 and 149 are inclined in the directions opposite to each other and hence forces in the opposite directions are applied from the balls 144 to the pocket portions 145*a* of the cage 145.

However, as illustrated in FIG. 26, in the case of the wedge angle components $\alpha$ due to the expansion between the groove bottoms of the track grooves 147 and 149 in the radial direction of the joint, the balls 144 within phase ranges of from 0° to 90° and from 270° to 360° in FIG. 25*b* are positioned between the straight track grooves 147*b* and 149*b*. Due to a wedge angle component $\alpha 1$ opened toward the opening side, a force toward the opening side is applied to the balls 144 within those phase ranges. On the other hand, the balls 144 within a phase range of from 90° to 270° are positioned between the arc-shaped track grooves 147*a* and 149*a*. Therefore, a wedge angle component $\alpha 2$, which is generated due to the expansion in the radial direction of the joint, is zero in the balls within this phase range, and hence no push-out force is generated in the balls 144. Thus, when the wedge angle components due to the crossing between the track grooves 147 and 149 and the wedge angle components $\alpha$ due to the expansion between the groove bottoms of the track grooves 147 and 149 in the radial direction of the joint are applied to the balls 144 in combination, the forces applied from the balls 144 to the pocket portions 145*a* of the cage 145 are not balanced with each other. As a result, there arises a problem in that the contact force to the spherical contact portions 152 and 146 of the cage 145 and the outer joint member 142, and the contact force to the spherical contact portions 153 and 148 of the cage 145 and the inner joint member 143 cannot be suppressed. In particular, it has been found that this problem is serious in terms of suppression of the torque loss and heat generation in a range of the frequently used operating angles including a normal angle.

Further, in the constant velocity universal joint 141 illustrated in FIGS. 25*a*-26, the straight track groove portion 147*b* is formed parallel to a joint axial line n-n at the time of being projected onto a plane including the ball raceway center line x and the joint center O. On the other hand, the straight track groove portion 149*b* is formed parallel to the joint axial line n-n at the time of being projected onto a plane including the ball raceway center line y and the joint center O. Thus, when the joint forms a high operating angle, a wedge angle formed between the straight track groove portions 147*b* and 149*b* becomes higher. As a result, a pop-out force of the ball 144 sandwiched between the straight track groove portions 147*b* and 149*b* toward the opening side is increased. It has been found that the increased pop-out force causes an increase in pocket load of the cage 145, which causes a problem with the strength of the cage 145 at high operating angles.

On the other hand, it is desired that the fixed type constant velocity universal joint absorb a small amplitude such as idling vibration that is caused by engine vibration to be transmitted from a differential gear into a cabin via the constant velocity universal joint during stopping of an automobile. In this context, it has been found that the axial play structure of the counter track type constant velocity universal joint disclosed in Patent Document 2 has the following problem. Specifically, in the counter track type constant velocity universal joint, when the inner joint member moves relative to the outer joint member in the axial direction, the opening angle $\alpha$ that increases on the interior side (first axial direction) and the opening angle $\beta$ that increases on the opening side (second axial direction) of the outer joint member are unequal to each other. In accordance therewith, the force F1 of the ball sandwiched between the first ball tracks and the force F2 of the ball sandwiched between the second ball tracks are unequal to each other. As a result, the inner joint member is biased in the axial direction to cause excessive spherical contact. Thus, heat generation may occur to cause a decrease in durability, and friction loss may occur to cause a decrease in transmission efficiency. Further, in the constant velocity universal joint disclosed in Patent Document 2, the large axial moving amount S is intended, which may have an adverse effect on a characteristic of the fixed type constant velocity universal joint.

In view of the above-mentioned problems, the present invention has an object to provide a fixed type constant velocity universal joint that is suppressed in torque loss and heat generation, enhanced in efficiency, capable of forming high operating angles, excellent in strength and durability at the high operating angles, and is suited to reduce noise, vibration, and harshness (NVH) of a vehicle as well.

Solutions to the Problems

As a result of various investigations for achieving the above-mentioned object, the inventors of the present invention have arrived at the following basic idea. In order to suppress torque loss and heat generation and to achieve higher efficiency, track grooves are formed to cross each other in a peripheral direction, arc-shaped first track groove portions are each formed to have a curvature center that is not offset in an axial direction with respect to a joint center so as to be adaptable to a range of frequently used operating angles, and second track groove portions are each formed into a different shape from that of the first track groove portions so as to increase an effective track length at a maximum operating angle and to be adaptable to a range of less frequently used high operating angles. In addition, the inventors of the present invention have arrived at such a novel idea of a relationship between axial clearances formed by an axial clearance between an inner joint member and a cage and an axial clearance between balls and the track grooves, focusing on reduction of noise, vibration, and harshness (NVH) of a vehicle, to thereby arrive at the present invention.

According to one embodiment of the present invention, as a technical solution for achieving the above-mentioned object, there is provided a fixed type constant velocity universal joint, comprising: an outer joint member having a spherical inner peripheral surface in which a plurality of track grooves are formed so as to extend in an axial direction of the outer joint member, the outer joint member having an opening side and an interior side spaced apart from each other in the axial direction; an inner joint member having a spherical outer peripheral surface in which a plurality of track grooves are formed so as to be paired with the plurality of track grooves of the outer joint member; a plurality of balls for transmitting torque, the plurality of balls being interposed between the plurality of track grooves of the outer joint member and the plurality of track grooves of the inner joint member; and a cage comprising pockets for receiving the plurality of balls, the cage having a spherical outer peripheral surface and a spherical inner peripheral surface, which are fitted to the spherical inner peripheral surface of the outer joint member and the spherical outer peripheral surface of the inner joint member, respectively, wherein the plurality of track grooves of the outer joint member comprise: first track groove portions 7a positioned on the interior side; and second track groove portions 7b positioned on the opening side, wherein each of the first track groove portions 7a comprises an arc part having a curvature center that is positioned without being offset in the axial direction with respect to a joint center O, wherein the first track groove portions 7a are inclined in a peripheral direction of the outer joint member with respect to a joint axial line N-N and adjacent to each other in the peripheral direction with their inclination directions opposite to each other, wherein each of the second track groove portions 7b is formed into a different shape from a shape of the each of the first track groove portions 7a so as to increase an effective track length at a maximum operating angle, wherein the each of the first track groove portions 7a and the each of the second track groove portions 7b are connected to each other at a position on the opening side with respect to the joint center O, wherein each of the plurality of track grooves of the inner joint member is formed so as to be mirror-image symmetrical with corresponding one of the plurality of paired track grooves of the outer joint member with respect to a plane P including the joint center O and being perpendicular to the joint axial line N-N at an operating angle of 0°, and wherein an axial clearance between the inner joint member and the cage is set to be larger than an axial clearance corresponding to a clearance between each of the plurality of balls and the each of the plurality of track grooves. Note that, the above-mentioned joint axial line refers to a longitudinal axial line that is a joint rotation center, and corresponds to a joint axial line N-N in the embodiments described later. The same applies to the joint axial line described in the scope of claims.

With the above-mentioned structure, it is possible to attain a fixed type constant velocity universal joint that is suppressed in torque loss and heat generation, markedly enhanced in efficiency, has a prolonged life due to the less heat generation, and is compactified. The fixed type constant velocity universal joint is also capable of forming high operating angles, excellent in strength and durability at the high operating angles, and is suited to reduce noise, vibration, and harshness (NVH) of a vehicle as well.

Specifically, it is desired that the clearance between the each of the plurality of balls and the each of the plurality of track grooves be set to a positive value. With this, vibration with small amplitude can effectively be absorbed.

With regard to the structure of the track grooves, when assuming that an angle formed by a straight line L connecting the joint center O and a connection point between the each of the above-mentioned first track groove portions 7a and the each of the above-mentioned second track groove portions 7b with respect to the plane P including the joint center O and being perpendicular to the joint axial line N-N at the operating angle of 0° is represented by $\beta$, the angle $\beta$ may be set appropriately depending on use conditions and the like. Considering the range of the normal operating angle of the constant velocity universal joint for an automobile, the angle $\beta$ is set to 3° to 10°, and thus the constant velocity universal joint is widely applicable to various vehicle types. Note that, the angle $\beta$ is herein defined as the smallest angle among the angles formed by the above-mentioned straight line L with respect to a straight line on the above-mentioned plane P, and the same applies to the embodiments and the scope of claims.

When the curvature center of the arc part of the each of the above-mentioned first track groove portions 7a is arranged on the joint axial line N-N, track groove depths can be equalized, and processes thereon can be simplified. Further, when the curvature center of the arc part of the each of the above-mentioned first track groove portions 7a is offset in a radial direction with respect to the joint axial line N-N, track groove depths on the interior side of the joint can be adjusted, with the result that optimum track groove depths can be secured.

The each of the above-mentioned second track groove portions 7b comprises an arc part. Further, the arc part of the each of the second track groove portions 7b has a curvature center offset to a radially outer side with respect to the each of the first track groove portions 7a and offset to the opening side with respect to the joint center O. With this, compactification can be achieved, and the effective track length can be increased. As a result, the maximum operating angle can be increased.

In addition, the each of the above-mentioned second track groove portions 7b comprises a straight part, and the straight part is formed with an inclination so as to come closer to the joint axial line N-N as a distance to the opening side becomes smaller. In this case, sizes of wedge angles formed between the straight track grooves at high operating angles can be decreased, and hence the strength of the cage can be secured.

Effects of the Invention

According to the one embodiment of the present invention, it is possible to attain the fixed type constant velocity universal joint that is suppressed in torque loss and heat generation, markedly enhanced in efficiency, has a prolonged life due to the less heat generation, and is compactified. The fixed type constant velocity universal joint is also capable of forming high operating angles, excellent in strength and durability at the high operating angles, and is suited to reduce noise, vibration, and harshness (NVH) of a vehicle as well.

BRIEF DESCRIPTION OF DRAWINGS

FIG. 1a is a partial vertical sectional view of a fixed type constant velocity universal joint according to a first embodiment of the present invention.

FIG. 1b is a right-hand side view of the fixed type constant velocity universal joint according to the first embodiment of the present invention.

FIG. 2a is a partial vertical sectional view of an outer joint member of the fixed type constant velocity universal joint of FIGS. 1a and 1b.

FIG. 2b is a right-hand side view of the outer joint member of the fixed type constant velocity universal joint of FIGS. 1a and 1b.

FIG. 6b is a view of a holding state of the ball between track grooves that are inclined in opposite directions to those of the track grooves of FIG. 6a.

FIG. 12a is a perspective view of the outer joint member.

FIG. 12b is a perspective view of the inner joint member.

FIG. 15a is a partial vertical sectional view of a fixed type constant velocity universal joint according to a third embodiment of the present invention.

FIG. 15b is a right-hand side view of the fixed type constant velocity universal joint according to the third embodiment of the present invention.

FIG. 21b is a main-part enlarged view of FIG. 21a.

FIG. 22b is a view illustrating a variation of the wedge angle of FIG. 22a.

FIG. 23a is a perspective view of the inner joint member.

FIG. 23b is a perspective view of the inner joint member.

FIG. 25a is a partial vertical sectional view of the fixed type constant velocity universal joint, for illustrating technical findings in the process to arrive at the present invention.

FIG. 25b is a right-hand side view of the fixed type constant velocity universal joint of FIG. 25a.

FIG. 30b is an enlarged view of a main part of FIG. 30a.

EMBODIMENTS OF THE INVENTION

Figure 3A:
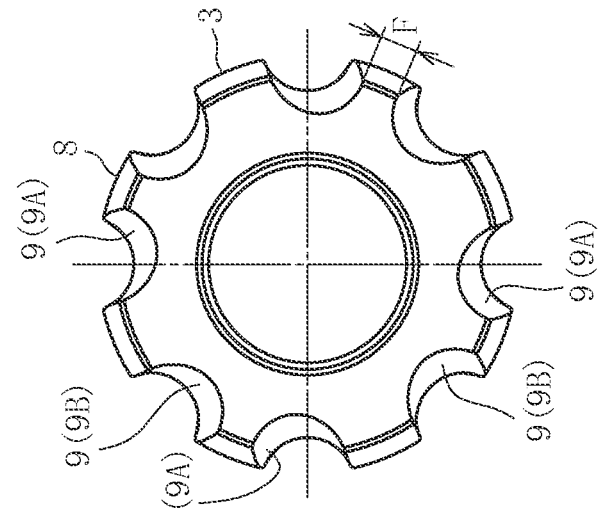
FIG. 3a is a left-hand side view of an inner joint member of the fixed type constant velocity universal joint of FIGS. 1a and 1b.

Embodiments of the present invention are described with reference to FIGS. 1 to 24.

FIGS. 1a to 13 illustrate a first embodiment of the present invention. FIGS. 1a and 1b illustrate a fixed type constant velocity universal joint according to the first embodiment. FIG. 1a is a partial vertical sectional view taken along the line C-O-C in FIG. 1b, and FIG. 1b is a right-hand side view of FIG. 1a. A constant velocity universal joint 1 mainly comprises an outer joint member 2, an inner joint member 3, balls 4, and a cage 5. As illustrated in FIGS. 1b, 2, and 3, respective eight track grooves 7 and 9 of the outer joint member 2 and the inner joint member 3 respectively comprise track grooves 7A and 7B and track grooves 9A and 9B that are inclined in a peripheral direction with respect to a joint axial line N-N and adjacent to each other in the peripheral direction with their inclination directions opposite to each other. Eight balls 4 are arranged in crossing portions of the paired track grooves 7A and 9A and the paired track grooves 7B and 9B of the outer joint member 2 and the inner joint member 3. FIG. 1a illustrates the track grooves 7 and 9 under a state in which cross sections thereof in a plane M illustrated in FIG. 2a and a plane Q illustrated in FIG. 3b are rotated at an inclination angle γ of 0°. Details of this state are described later.

FIG. 1a illustrates a vertical cross section of the joint. The term "ball raceway center line" is used herein for description to accurately describe the form, such as an inclined state and a curved state, and the shape of the track grooves extending in the axial direction. The ball raceway center line herein refers to a trajectory of the center of the ball arranged between the track grooves at the time of moving along the track grooves. Thus, the inclined state of the track grooves corresponds to an inclined state of the ball raceway center lines, and an arc-shaped state or a straight state of the track grooves correspond to an arc-shaped state or a straight state of the ball raceway center lines.

As illustrated in FIG. 1a, each track groove 7 of the outer joint member 2 has a ball raceway center line X. The track groove 7 comprises a first track groove portion 7a having an arc-shaped ball raceway center line Xa about a curvature center at a joint center O, and a second track groove portion 7b having an arc-shaped ball raceway center line Xb curved in an opposite direction to that of the first track groove portion 7a. The ball raceway center line Xb of the second track groove portion 7b is smoothly connected to the ball raceway center line Xa of the first track groove portion 7a. On the other hand, each track groove 9 of the inner joint member 3 has a ball raceway center line Y. The track groove 9 comprises a first track groove portion 9a having an arc-shaped ball raceway center line Ya about a curvature center at the joint center O, and a second track groove portion 9b having an arc-shaped ball raceway center line Yb curved in an opposite direction to that of the first track groove portion 9a. The ball raceway center line Yb of the second track groove portion 9b is smoothly connected to the ball raceway center line Ya of the first track groove portion 9a. In this way, the ball raceway center lines Xa and Ya of the first track groove portions 7a and 9a have different shapes from the ball raceway center lines Xb and Yb of the second track groove portions 7b and 9b, respectively.

The curvature centers of the ball raceway center lines Xa and Ya of the first track groove portions 7a and 9a are arranged at the joint center O, that is, on the joint axial line N-N. Thus, track groove depths can be equalized, and processes thereon can be simplified.

Although illustration is omitted, the track grooves 7 and 9 are formed into an elliptical shape or a Gothic arch shape in horizontal cross section, and the track grooves 7 and 9 are held in so-called angular contact with each ball 4 at a contact angle (approximately from 30° to 45°). Thus, the ball 4 is held in contact with the track grooves 7 and 9 on their side surface sides, which are slightly spaced apart from groove bottoms of the track grooves 7 and 9.

Referring to FIGS. 2a and 2b, description is given of a state in which the track grooves 7 of the outer joint member 2 are inclined in the peripheral direction with respect to the joint axial line N-N. FIG. 2a is a partial vertical sectional view of the outer joint member 2, and FIG. 2b is a right-hand side view of the outer joint member 2. The track grooves 7 of the outer joint member 2 are represented by the reference symbols 7A and 7B to indicate a difference in inclination direction thereof. As illustrated in FIG. 2a, the plane M including the ball raceway center line X of each track groove 7A and the joint center O is inclined at the angle γ with respect to the joint axial line N-N. In addition, with regard to each track groove 7B adjacent to the track groove 7A in the peripheral direction, although illustration is omitted, another plane M including the ball raceway center line X of the track groove 7B and the joint center O is inclined at the angle γ with respect to the joint axial line N-N in an opposite direction to the inclination direction of the track groove 7A. In this embodiment, the entire ball raceway center line X of the track groove 7A, that is, both the ball raceway center line Xa of the first track groove portion 7a and the ball raceway center line Xb of the second track groove portion 7b are formed in the plane M. However, the present invention is not limited thereto, and there may be carried out such an embodiment that only the ball raceway center line Xa of the first track groove portion 7a is included in the plane M. Thus, it is only necessary that the planes M including at least the ball raceway center line Xa of the first track groove portion 7a and the joint center O be inclined in the peripheral direction with respect to the joint axial line N-N with their inclination directions opposite to each other in the first track groove portions 7a adjacent to each other in the peripheral direction.

Now, supplementary description is given of the reference symbols of the track grooves. Reference symbol 7 represents the track grooves of the outer joint member 2 as a whole, and reference symbols 7a and 7b represent the first and second track groove portions. When the track grooves having different inclination directions are to be distinguished from each other, the track grooves are represented by reference symbols 7A and 7B. Further, reference symbols 7Aa and 7Ba represent first track groove portions of the respective track grooves 7A and 7B, and reference symbols 7Ab and 7Bb represent second track groove portions of the respective track grooves 7A and 7B. The track grooves of the inner joint member 3 described later are represented by the reference symbols in a similar manner.

Figure 3B:
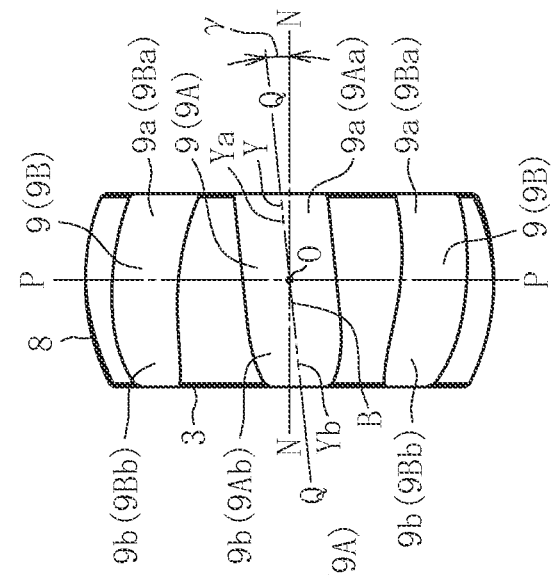
FIG. 3b is a view of an outer peripheral surface of the inner joint member of the fixed type constant velocity universal joint of FIGS. 1a and 1b.
Figure 3C:
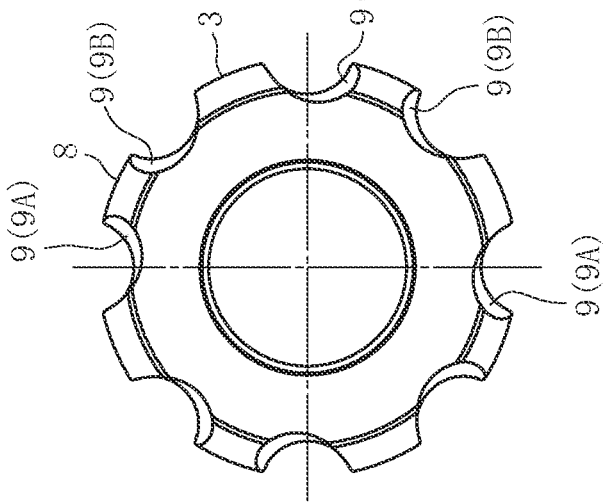
FIG. 3c is a right-hand side view of the inner joint member of the fixed type constant velocity universal joint of FIGS. 1a and 1b.

Next, referring to FIGS. 3a-3c, description is given of a state in which the track grooves 9 of the inner joint member 3 are inclined in the peripheral direction with respect to the joint axial line N-N. FIG. 3b illustrates an outer peripheral surface of the inner joint member 3, FIG. 3a is a left-hand side view of the inner joint member 3, and FIG. 3c is a right-hand side view of the inner joint member 3. The track grooves 9 of the inner joint member 3 are represented by the reference symbols 9A and 9B to indicate a difference in inclination direction thereof. As illustrated in FIG. 3b, the plane Q including the ball raceway center line Y of each track groove 9A and the joint center O is inclined at the angle γ with respect to the joint axial line N-N. In addition, with regard to each track groove 9B adjacent to the track groove 9A in the peripheral direction, although illustration is omitted, another plane Q including the ball raceway center line Y of the track groove 9B and the joint center O is inclined at the angle γ with respect to the joint axial line N-N in an opposite direction to the inclination direction of the track groove 9A. The inclination angle γ is preferably in a range of from 4° to 12° in consideration of operability of the constant velocity universal joint 1 and a spherical width F between the closest sides of the track grooves of the inner joint member 3.

Similarly to the outer joint member described above, in this embodiment, the entire ball raceway center line Y of the track groove 9A, that is, both the ball raceway center line Ya of the first track groove portion 9a and the ball raceway center line Yb of the second track groove portion 9b are formed in the plane Q. However, the present invention is not limited thereto, and may be carried out in such an embodiment that only the ball raceway center line Ya of the first track groove portion 9a is included in the plane Q. Therefore, it is only necessary that the planes Q including at least the ball raceway center line Ya of the first track groove portion 9a and the joint center O be inclined in the peripheral direction with respect to the joint axial line N-N with their inclination directions opposite to each other in the first track groove portions 9a adjacent to each other in the peripheral direction. The ball raceway center line Y of the track groove 9 of the inner joint member 3 is formed so as to be mirror-image symmetrical with the ball raceway center line X of the paired track groove 7 of the outer joint member 2 with respect to a plane P including the joint center O and being perpendicular to the joint axial line N-N at an operating angle of 0°.

Figure 4:
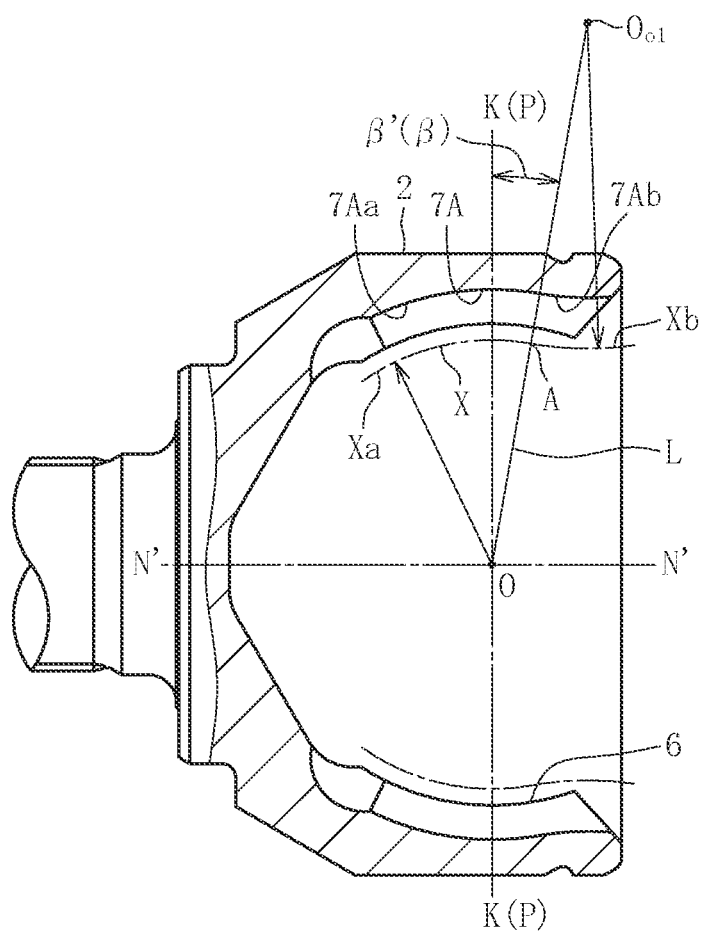
FIG. 4 is a partial vertical sectional view of details of track grooves of the outer joint member.

Referring to FIG. 4, detailed description is given of the track grooves in the vertical cross section of the outer joint member 2. FIG. 4 is a sectional view of a partial vertical cross section taken along the above-mentioned plane M of FIG. 2a, which includes the ball raceway center line X of the track groove 7A and the joint center O. Thus, to be strict, FIG. 4 is not a vertical sectional view in the plane including the joint axial line N-N, but illustrates a cross section inclined at the angle γ. FIG. 4 illustrates the track groove 7A of the outer joint member 2. Detailed description of the track groove 7B is omitted because the inclination direction of the track groove 7B is merely opposite to that of the track groove 7A and other structural details of the track groove 7B are the same as those of the track groove 7A.

As illustrated in FIG. 4, in a spherical inner peripheral surface 6 of the outer joint member 2, the track grooves 7A are formed along the axial direction. Each track groove 7A has the ball raceway center line X, and comprises the first track groove portion 7Aa having the arc-shaped ball raceway center line Xa about the curvature center at the joint center O (not offset in the axial direction), and the second track groove portion 7Ab having the arc-shaped ball raceway center line Xb about the curvature center at a point $O_{o1}$ offset from the joint center O to the opening side in the axial direction on a radially outer side of the ball raceway center line Xa of the first track groove portion 7Aa (that is, radially outer side of the first track groove portion 7Aa). Thus, the arc-shaped ball raceway center line Xb of the second track groove portion 7Ab is curved in an opposite direction to that of the arc-shaped ball raceway center line Xa of the first track groove portion 7Aa. An end portion A on the opening side of the ball raceway center line Xa of the first track groove portion 7Aa is a point at which a straight line connecting the joint center O and the offset point $O_{o1}$ crosses the ball raceway center line X, and L represents a straight line connecting the end portion A and the joint center O. The ball raceway center line Xb of the second track groove portion 7Ab is smoothly connected to the end portion A. That is, the end portion A is a connecting point between the first track groove portion 7Aa and the second track groove portion 7Ab.

As illustrated in FIG. 4, an angle @' formed between the straight line L and a perpendicular line K at the joint center O, which is perpendicular to a joint axial line N'-N' projected onto the plane M (see FIG. 2a) including the ball raceway center line X of the track groove 7A and the joint center O, is inclined at the angle γ with respect to the joint axial line N-N. The above-mentioned perpendicular line K is formed in the plane P including the joint center O and being perpendicular to the joint axial line N-N at the operating angle of 0°. Thus, in the present invention, an angle β formed by the straight line L with respect to the plane P including the joint center O and being perpendicular to the joint axial line N-N at the operating angle of 0° satisfies a relationship of $\sin β = \sin β' \times \cos γ$. Each of the above-mentioned first track groove portion 7Aa and the above-mentioned second track groove portion 7Ab of the outer joint member 2 is formed of a single arc, but the present invention is not limited thereto. The first track groove portion 7Aa and the second track groove portion 7Ab may be formed of a plurality of arcs in consideration of the track groove depths and the like.

Figure 5:
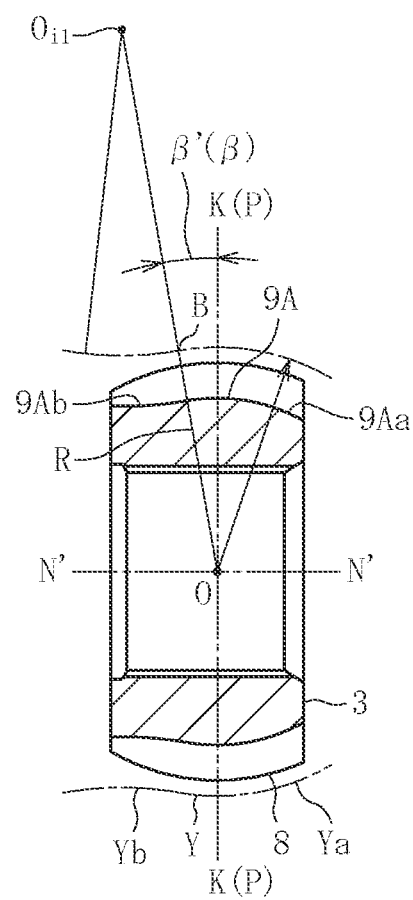
FIG. 5 is a vertical sectional view of details of track grooves of the inner joint member.

Similarly, referring to FIG. 5, detailed description is given of the track grooves in the vertical cross section of the inner joint member 3. FIG. 5 is a sectional view of a vertical cross section taken along the above-mentioned plane Q of FIG. 3b, which includes the ball raceway center line Y of the track groove 9A and the joint center O. Thus, similarly to FIG. 4, to be strict, FIG. 5 is not a vertical sectional view in the plane including the joint axial line N-N, but illustrates a cross section inclined at the angle γ. FIG. 5 illustrates the track groove 9A of the inner joint member 3. Description of the track groove 9B is omitted because the inclination direction of the track groove 9B is merely opposite to that of the track groove 9A and other structural details of the track groove 9B are the same as those of the track groove 9A. In a spherical outer peripheral surface 8 of the inner joint member 3, the track grooves 9A are formed along the axial direction. Each track groove 9A has the ball raceway center line Y, and comprises the first track groove portion 9Aa having the arc-shaped ball raceway center line Ya about the curvature center at the joint center O (not offset in the axial direction), and the second track groove portion 9Ab having the arc-shaped ball raceway center line Yb about the curvature center at a point $O_{i1}$ offset from the joint center O to the interior side in the axial direction on a radially outer side of the ball raceway center line Ya of the first track groove portion 9Aa (that is, radially outer side of the first track groove portion 9Aa). An end portion B on the interior side of the first track groove portion 9Aa is a point at which a straight line connecting the joint center O and the offset point $O_{i1}$ crosses the ball raceway center line Y, and R represents a straight line connecting the end portion B and the joint center O. The ball raceway center line Yb of the second track groove portion 9Ab is smoothly connected to the end portion B. That is, the end portion B is a connecting point between the first track groove portion 9Aa and the second track groove portion 9Ab.

As illustrated in FIG. 5, an angle @' formed between the straight line R and a perpendicular line K at the joint center O, which is perpendicular to the joint axial line N'-N' projected onto the plane Q (see FIG. 3b) including the ball raceway center line Y of the track groove 9A and the joint center O, is inclined at the angle γ with respect to the joint axial line N-N. The above-mentioned perpendicular line K is formed in the plane P including the joint center O and being perpendicular to the joint axial line N-N at the operating angle of 0°. Thus, an angle β formed by the straight line R with respect to the plane P including the joint center O and being perpendicular to the joint axial line N-N at the operating angle of 0° satisfies a relationship of sin β=sin β'×cos γ. Similarly to the track grooves of the outer joint member 2 described above, each of the above-mentioned first track groove portion 9Aa and the above-mentioned second track groove portion 9Ab of the inner joint member 3 may be formed of a plurality of arcs in consideration of the track groove depths and the like.

Next, description is given of the angle β formed by each of the straight lines L and R with respect to the plane P including the joint center O and being perpendicular to the joint axial line N-N at the operating angle of 0°. At an operating angle θ, each ball 4 moves by θ/2 with respect to the plane P including the joint center O and being perpendicular to the joint axial line N-N in the outer joint member 2 and the inner joint member 3. The angle β is determined based on ½ of a frequently used operating angle, and a contact range of the track groove for the ball 4 is determined within a range of the frequently used operating angle. Now, the frequently used operating angle is defined. First, the normal angle of the joint refers to an operating angle to be formed in a fixed type constant velocity universal joint of a front drive shaft of an automobile with one person onboard when the steering of the automobile is switched to a straightforward mode on a horizontal and flat road surface. In general, the normal angle is selected and determined within a range of from 2° to 15° in accordance with design conditions for vehicle types. In addition, the frequently used operating angle refers to an operating angle to be formed in the fixed type constant velocity universal joint of the above-mentioned automobile during, for example, continuous travel on a curved road, instead of a high operating angle to be formed at the time of, for example, right and left turns at a traffic intersection. This operating angle is also determined in accordance with the design conditions for vehicle types. The frequently used operating angle is supposed to be 20° at maximum. Thus, the angle β formed by each of the straight lines L and R with respect to the plane P including the joint center O and being perpendicular to the joint axial line N-N at the operating angle of 0° is set to 3° to 10°. Note that, the angle β is not limited to 3° to 10°, and may be set appropriately in accordance with the design conditions for vehicle types. When the angle β is set to 3° to 10°, the fixed type constant velocity universal joint of this embodiment is widely applicable to various vehicle types.

Due to the above-mentioned angle β, in FIG. 4, the end portion A of the ball raceway center line Xa of the first track groove portion 7Aa corresponds to a center position of the ball that is moved to the end of the opening side along the axial direction at the frequently used operating angle. Similarly, in the case of the inner joint member 3, in FIG. 5, the end portion B of the ball raceway center line Ya of the first track groove portion 9Aa corresponds to a center position of the ball that is moved to the end of the interior side along the axial direction at the frequently used operating angle. With this setting, within the range of the frequently used operating angles, the balls 4 are positioned between the first track groove portions 7Aa and 9Aa of the outer joint member 2 and the inner joint member 3 and the first track groove portions 7Ba and 9Ba that are inclined in the opposite directions to those of the first track groove portions 7Aa and 9Aa (see FIGS. 2 and 3). Therefore, forces in the opposite directions are applied from the balls 4 to pocket portions 5a of the cage 5 that are adjacent to each other in the peripheral direction. Therefore, the cage 5 is stabilized at the position of the joint center O (see FIG. 1). Thus, a contact force between a spherical outer peripheral surface 12 of the cage 5 and the spherical inner peripheral surface 6 of the outer joint member 2, and a contact force between a spherical inner peripheral surface 13 of the cage 5 and the spherical outer peripheral surface 8 of the inner joint member 3 are suppressed. Accordingly, the joint is smoothly operated under high load and in high speed rotation. As a result, torque loss and heat generation are suppressed, and the durability is enhanced.

Figure 6A:
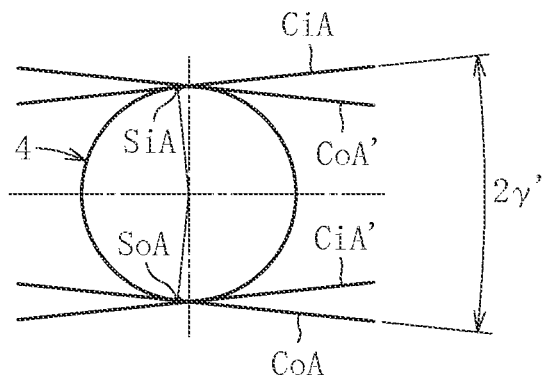
FIG. 6a is a view of a holding state of a ball between track grooves.

Next, referring to FIGS. 6a to 10, description is given of a conspicuous feature of this embodiment, that is, the structure for and effect of absorbing vibration with small amplitude. FIGS. 6a and 6b are views of holding states of the ball between the track grooves. The state illustrated in FIG. 6a is viewed in a direction of the arrow D in FIG. 1b, and the state illustrated in FIG. 6b is viewed in a direction of the arrow E in FIG. 1b. FIGS. 6a and 6b illustrate actual wedge angles 2γ' between contact points SoA and SiA between the ball 4 and the track grooves 7A and 9A (see FIG. 1b), and contact points SoB and SiB of the ball 4 and the track grooves 7B and 9B (see FIG. 1b). In the illustration, for the sake of ease of understanding of the description, the contact points SoA, SiA, SoB, and SiB are positioned in a plane of the drawing sheet. Also in FIG. 7, the actual wedge angles 2γ' are illustrated under the state in which the contact points between the ball and the track grooves are positioned in the plane of the drawing sheet.

FIG. 6a illustrates contact point trajectories CoA and CoA' between the track groove 7A of the outer joint member 2 and the ball 4, and contact point trajectories CiA and CiA' between the track groove 9A of the inner joint member 3 and the ball 4. Under a state in which torque in a direction of the hollow arrow indicated in FIG. 1b is applied to the inner joint member 3, the contact point trajectories CoA and CiA correspond to a load side, the contact point trajectories CoA' and CiA' correspond to a non-load side. The constant velocity universal joint 1 according to this embodiment is of a track groove crossing type, and hence the track grooves 7 and 9 are not offset in the axial direction. However, the wedge angle 2γ' is formed between the contact point trajectories CoA and CiA on the load side in a manner of sandwiching the ball 4. Although illustration is omitted, the wedge angle 2γ' between the contact point trajectories CoA' and CiA' on the non-load side increases in an opposite direction to a direction in which the wedge angle 2γ' between the contact point trajectories CoA and CiA on the load side increases.

Figure 6B:
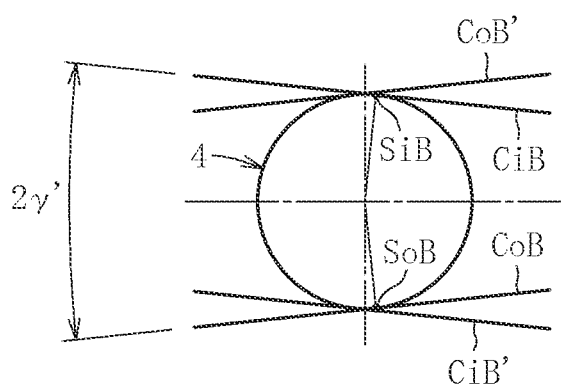

FIG. 6b illustrates the track grooves 7B and 9B (see FIG. 1b) inclined in the opposite directions to those of the above-mentioned track grooves 7A and 9A. Contact point trajectories between the track groove 7B of the outer joint member 2 and the ball 4 are represented by CoB and CoB', and contact point trajectories between the track groove 9B of the inner joint member 3 and the ball 4 are represented by CiB and CiB'. Similarly to FIG. 6a, under the state in which the torque in the direction of the hollow arrow indicated in FIG. 1b is applied to the inner joint member 3, the contact point trajectories CoB and CiB correspond to the load side, the contact point trajectories CoB' and CiB' correspond to the non-load side. The wedge angle 2γ', which is formed between the contact point trajectories CoB and CiB on the load side in a manner of sandwiching the ball 4, increases in an opposite direction to the direction in which the wedge angle 2γ' between the above-mentioned contact point trajectories CoA and CiA of the track grooves 7A and 9A increases.

Figure 7:
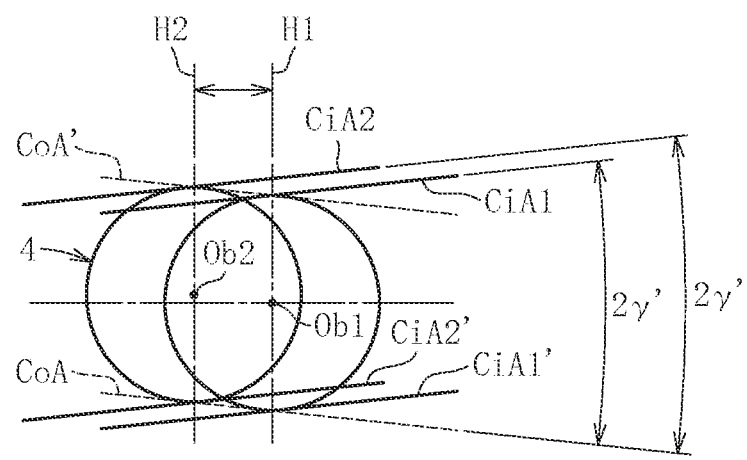
FIG. 7 is a view of holding states of the ball between track grooves at the time when both the joint members move relative to each other in an axial direction.

FIG. 7 illustrates a state in which the inner joint member 3 is displaced in the axial direction relative to the outer joint member 2 with the ball being held between the track grooves as illustrated in FIG. 6a. An axial position of a center Ob1 of the ball 4 before the displacement is represented by H1, and an axial position of a center Ob2 of the ball 4 after the displacement is represented by H2. Further, the contact point trajectories CoA and CoA' between the track groove 7A of the outer joint member 2 and the ball 4 are indicated by the broken lines. Contact point trajectories between the track groove 9A of the inner joint member 3 and the ball 4 before the displacement are represented by CiA1 and CiA1', and those after the displacement are represented by CiA2 and CiA2'.

In the constant velocity universal joint 1 according to this embodiment, the track grooves 7 and 9 are not offset in the axial direction. Thus, the wedge angle 2γ' is determined based on inclination angles of the track groove 7 and 9, that is, the inclination angle γ (see FIGS. 2a and 3b) of the ball raceway center line. Thus, as illustrated in FIG. 7, even when the axial position of the ball 4 varies, crossing angles between the track grooves remain unchanged. As a result, the wedge angle 2γ' between the contact point trajectories CoA and CiA remains unchanged as well. The same applies to the contact point trajectories CoB and CiB of the track grooves 7B and 9B. Thus, the forces of the ball 4 to the cage 5, which are generated at the wedge angle 2γ' between the contact point trajectories CoA and CiA and the wedge angle 2γ' between the contact point trajectories CoB and CiB, are balanced with each other.

Figure 8:
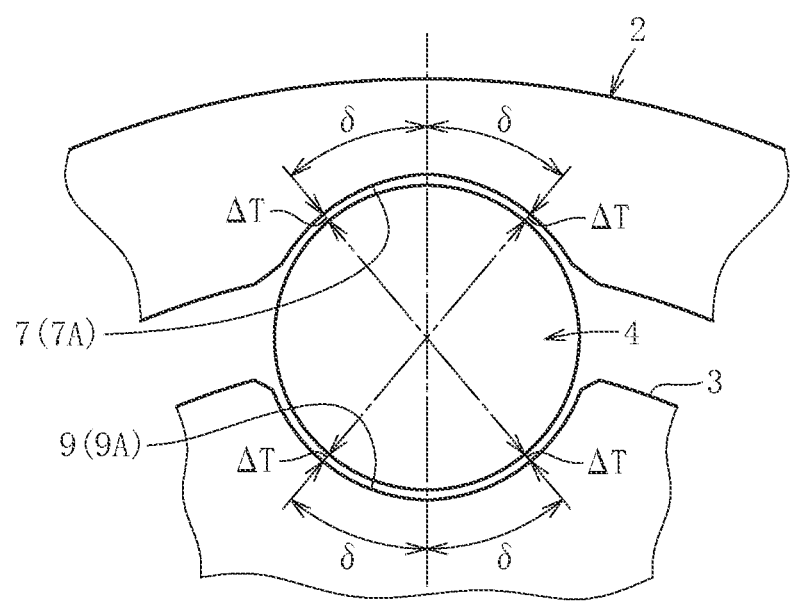
FIG. 8 is a horizontal sectional view of clearances between the ball and the track grooves.
Figure 9:
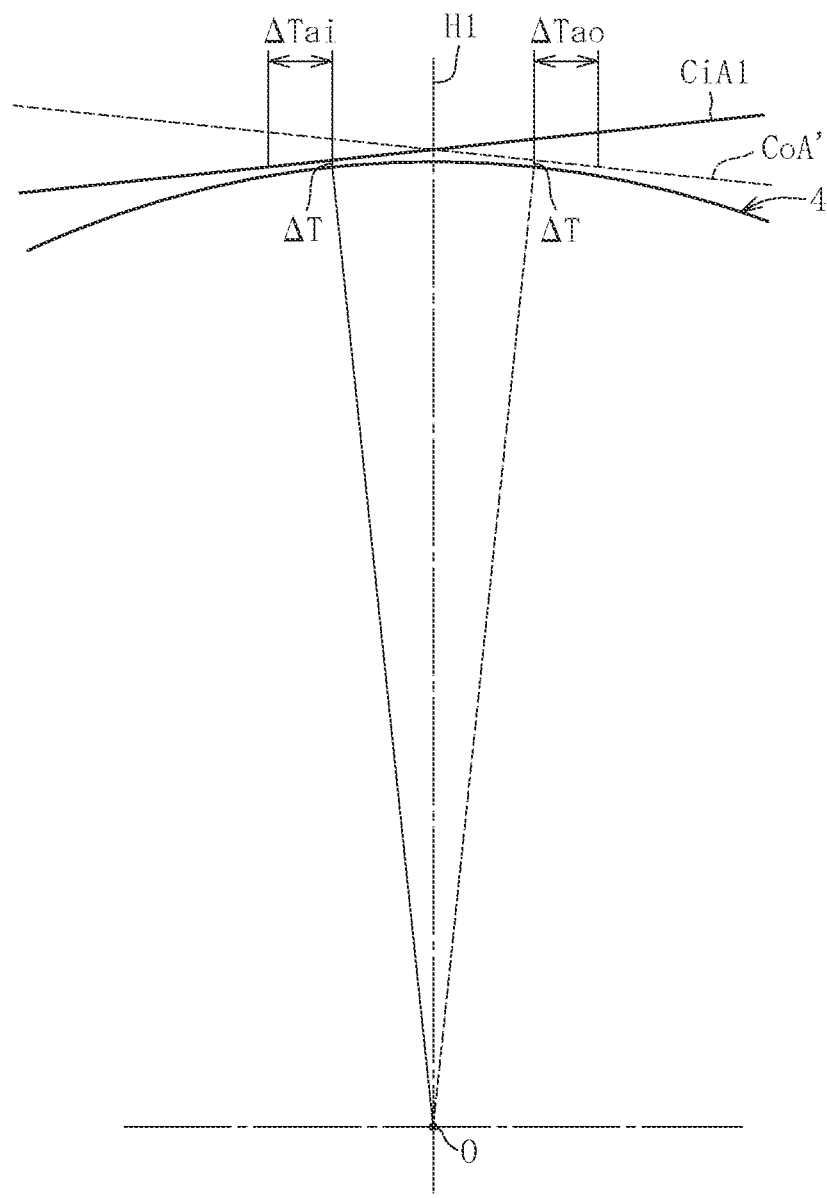
FIG. 9 is an enlarged view illustrating an axial clearance formed by the clearances between the ball and the track groove.
Figure 10:
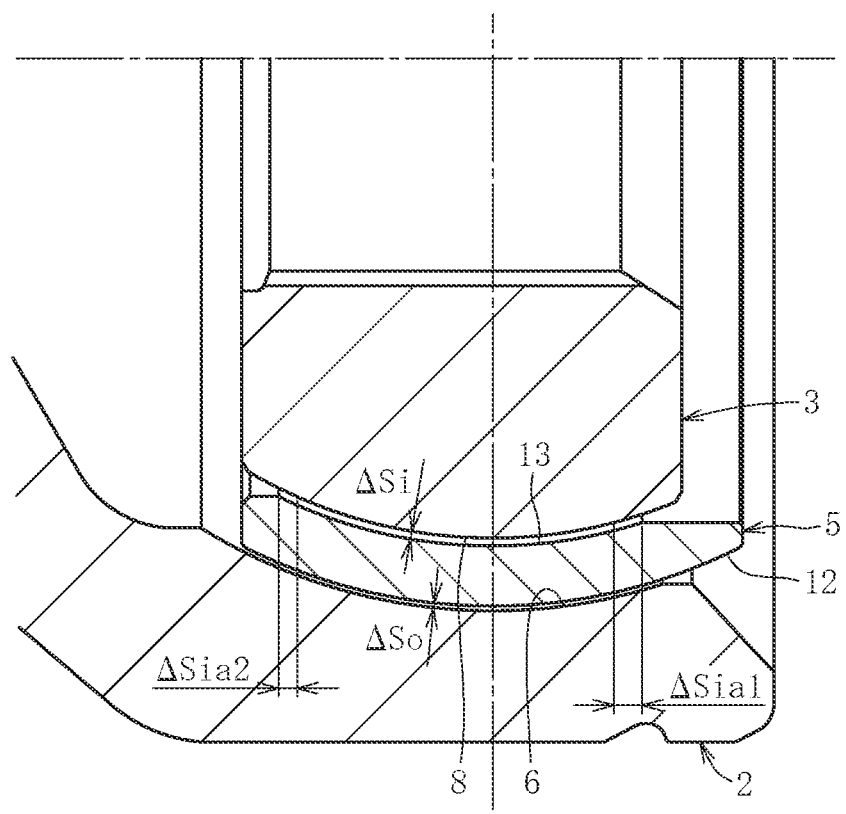
FIG. 10 is a vertical sectional view of a spherical clearance on an enlarged scale.

Next, description is given of spherical clearances between the cage and both the joint members, and clearances between the ball and the track grooves. The axial displacement in the fixed type constant velocity universal joint is relevant to the spherical clearances between the cage and both the joint members, and the clearances between the ball and the track grooves. In the constant velocity universal joint 1 according to this embodiment, based on the feature that the above-mentioned wedge angle 2γ' remains unchanged irrespective of the axial position of the ball 4, spherical clearances between the cage 5 and both the joint members 2 and 3, and clearances between the ball 4 and the track grooves 7 and 9 are set to achieve smooth operation to absorb a larger amount of vibration. Referring to FIGS. 8 to 10, description is given of a relationship between the spherical clearances between the cage 5 and both the joint members 2 and 3, and the clearances between the ball 4 and the track grooves 7 and 9.

First, description is given of the clearances between the ball 4 and the track grooves 7 and 9 with reference to FIGS. 8 and 9. FIG. 8 is a partial horizontal sectional view taken along the plane P (see FIG. 1a) including the joint center O and being perpendicular to the joint axial line N-N at the operating angle of 0°. Note that, the track grooves 7 (7A) and 9 (9A) in the illustration of the cross section are perpendicular to the ball raceway center lines X and Y of the track grooves 7 (7A) and 9 (9A). In FIG. 9, only the radially upper side in FIG. 7 is illustrated on an enlarged scale.

As illustrated in FIG. 8, the ball 4 and each of the track groove 7 (7A) of the outer joint member 2 and the track groove 9 (9A) of the inner joint member 3 are held in angular contact at contact angles δ, and clearances ΔT are formed in the directions of the contact angles δ. It is desired that the clearances ΔT between the ball 4 and each of the track groove 7 (7A) and 9 (9A) be each set to a positive value. With this, vibration with small amplitude can effectively be absorbed. For the sake of better understanding of the description, the clearances ΔT are illustrated on an exaggerated scale.

In the state illustrated in FIG. 9, the axial position H1 before the displacement, which is illustrated in FIG. 7, is matched with the joint center O, and both the joint members under a non-load state are at neutral positions in the peripheral direction as in FIG. 8. The clearances ΔT are formed between the ball 4 and the contact point trajectories CoA' and CiA1 of the track grooves 7 (7A) and 9 (9A). Thus, an axial clearance ΔTao (i.e., a third axial clearance) is formed between the ball 4 and the contact point trajectory CoA' of the track groove 7 (7A) of the outer joint member 2, and an axial clearance ΔTai (i.e., a fourth axial clearance) is formed between the ball 4 and the contact point trajectory CiA1 of the track groove 9 (9A) of the inner joint member 3. Although illustration is omitted, similarly, the axial clearance ΔTao is formed between the ball 4 and the contact point trajectory CoA of the track groove 7 (7A) of the outer joint member 2, and the axial clearance ΔTai is formed between the ball 4 and the contact point trajectory CiA1' of the track groove 9 (9A) of the inner joint member 3.

Next, referring to FIG. 10, description is given of the spherical clearances between the cage 5 and both the joint members 2 and 3. A spherical clearance ΔSo is formed between the spherical inner peripheral surface 6 of the outer joint member 2 and the spherical outer peripheral surface 12 of the cage 5, and a spherical clearance ΔSi is formed between the spherical outer peripheral surface 8 of the inner joint member 3 and the spherical inner peripheral surface 13 of the cage 5. An axial clearance ΔSia1 (i.e., a first axial clearance) and an axial clearance ΔSia2 (i.e., a second axial clearance) that are formed between the inner joint member 3 and the cage 5 respectively on the opening side and the interior side of the outer joint member 2 are formed by the spherical clearance ΔSi between the spherical outer peripheral surface 8 of the inner joint member 3 and the spherical inner peripheral surface 13 of the cage 5.

The above-mentioned axial clearances ΔSia1 and ΔSia2 between the inner joint member 3 and the cage 5, and the above-mentioned axial clearances ΔTao and ΔTai between the ball and the track grooves are set as follows.

$$\Delta Sia1 > (\Delta Tao + \Delta Tai)$$

$$\Delta Sia2 > (\Delta Tao + \Delta Tai)$$

Note that, in Scope of Claims, the description "an axial clearance between the inner joint member and the cage is set to be larger than an axial clearance corresponding to a clearance between each of the plurality of balls and each of the plurality of track grooves" corresponds to the above-mentioned relationships.

When the relationships as described above are established, that is, when the clearances between the ball and the track grooves are set as positive clearances, the balls are caused to roll on the track grooves, for example, by axial small vibration such as idling vibration that is caused by engine vibration transmitted from a differential gear via a plunging type constant velocity universal joint, an intermediate shaft, and the inner joint member of the fixed type constant velocity universal joint during stopping of an automobile. With this, the outer joint member 2 and the inner joint member 3 can smoothly be displaced relative to each other in the axial direction. Also at the time of the relative displacement, the axial clearances between the spherical surfaces can be secured because, as described above, the axial clearances ΔSia1 and ΔSia2 between the inner joint member 3 and the cage 5 are each set to be larger than a sum of Mao and Mai. In addition, as described above, the forces of the ball 4 to the cage 5, which are generated at the wedge angle 2γ' between the contact point trajectories CoA and CiA and the wedge angle 2γ' between the contact point trajectories CoB and CiB, are balanced with each other. With this, the axial clearances between the spherical surfaces can be maintained without causing the cage 5 to be biased in the axial direction. Those mutual effects enable both the above-mentioned joint members 2 and 3 to be displaced relative to each other in the axial direction by the rolling of the balls 4 without causing spherical contact between the spherical outer peripheral surface 8 of the inner joint member 3 and the spherical inner peripheral surface 13 of the cage 5. With this, vibration with small amplitude in the axial direction, such as idling vibration, can smoothly be absorbed.

The axial clearances ΔSia1 and ΔSia2 between the inner joint member 3 and the cage 5, and the axial clearances ΔTao and ΔTai between the ball and the track grooves are set as described above. Thus, it is only necessary that the spherical clearance ΔSo between the spherical inner peripheral surface 6 of the outer joint member 2 and the spherical outer peripheral surface 12 of the cage 5 have such a minimum size that bending operation is not disturbed.

Further, the fixed type constant velocity universal joint of a track groove crossing type has the structural advantage that the wedge angle 2γ' between the contact point trajectories CoA and CiA between the ball 4 and the track grooves 7A and 9A, and the wedge angle 2γ' between the contact point trajectories CoB and CiB between the ball 4 and the track grooves 7B and 9B remain unchanged. With this, the forces to be applied from the ball 4 to the cage 5 can be balanced with each other, and hence the spherical contact does not occur. As a result, heat generation by the spherical contact can be suppressed, and efficiency and durability can be enhanced.

The above-mentioned structure for absorbing vibration with small amplitude, and the effects thereby are the same as those in other embodiments described later.

Figure 11:
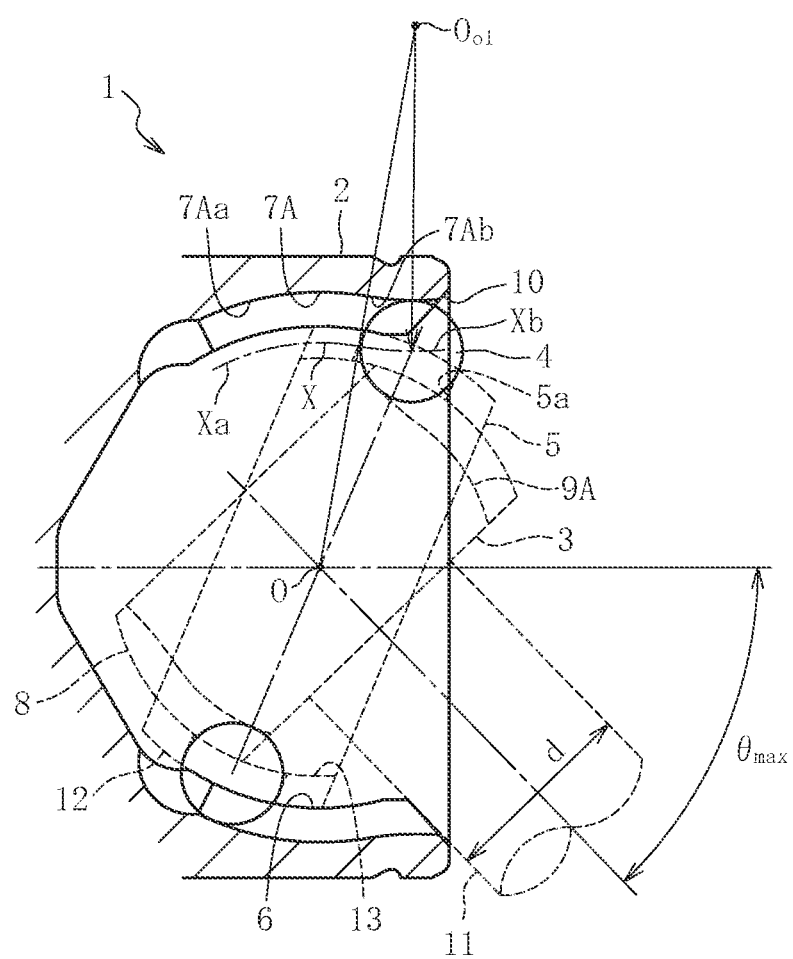
FIG. 11 is a schematic view of a state in which the joint forms a maximum operating angle.

FIG. 11 illustrates a state in which the constant velocity universal joint according to this embodiment forms a maximum operating angle. In the track groove 7A of the outer joint member 2, the second track groove portion 7Ab having the arc-shaped ball raceway center line Xb about the curvature center at the point $O_{o1}$ offset from the joint center O to the opening side in the axial direction on the radially outer side of the ball raceway center line Xa of the first track groove portion 7Aa is formed on the opening side. Irrespective of the compact design, by forming the second track groove portion 7Ab, the effective track length and the maximum operating angle can be increased. Thus, as illustrated in FIG. 11, even in a case where a maximum operating angle $\theta_{max}$ is set as high as approximately 50° and an inlet chamfer 10 having a necessary and sufficient size is formed, the ball 4 and the second track groove portion 7Ab can be reliably held in contact.

Note that, in a range of high operating angles, the balls 4 arranged in the peripheral direction are temporarily separately positioned between the first track groove portions 7Aa and 9Aa (7Ba and 9Ba, see FIGS. 6a and 7b) and between the second track groove portions 7Ab and 9Ab (7Bb and 9Bb, see FIGS. 6a and 7b). Along with this, the forces applied from the balls 4 to the pocket portions 5a of the cage 5 are not balanced with each other, and hence the contact forces are generated in the spherical contact portions 12 and 6 of the cage 5 and the outer joint member 2, and in the spherical contact portions 13 and 8 of the cage 5 and the inner joint member 3. However, the angles in the range of high operating angles are used less frequently. Thus, the constant velocity universal joint 1 according to this embodiment is comprehensively capable of suppressing the torque loss and heat generation. Thus, it is possible to attain a compact fixed type constant velocity universal joint that is suppressed in torque loss and heat generation, enhanced in efficiency, capable of forming high operating angles, and is excellent in strength and durability at the high operating angles.

FIGS. 12a and 12b are perspective views of the outer joint member 2 and the inner joint member 3 of the constant velocity universal joint according to this embodiment. Those perspective views illustrate the above-mentioned track grooves in a three-dimensional manner. As illustrated in FIG. 12a, the track grooves 7A and 7B inclined in the peripheral direction with respect to the joint axial line N-N (not shown) are alternately formed in the spherical inner peripheral surface 6 of the outer joint member 2 with their inclination directions alternately opposite to each other. Each track groove 7A comprises the first track groove portion 7Aa and the second track groove portion 7Ab, and each track groove 7B comprises the first track groove portion 7Ba and the second track groove portion 7Bb. The inlet chamfer 10 is formed at an opening end of the outer joint member 2. Further, as illustrated in FIG. 12b, the track grooves 9A and 9B inclined in the peripheral direction with respect to the joint axial line N-N (not shown) are alternately formed in the spherical outer peripheral surface 8 of the inner joint member 3 with their inclination directions alternately opposite to each other. Each track groove 9A comprises the first track groove portion 9Aa and the second track groove portion 9Ab, and each track groove 9B comprises the first track groove portion 9Ba and the second track groove portion 9Bb.

Figure 13:
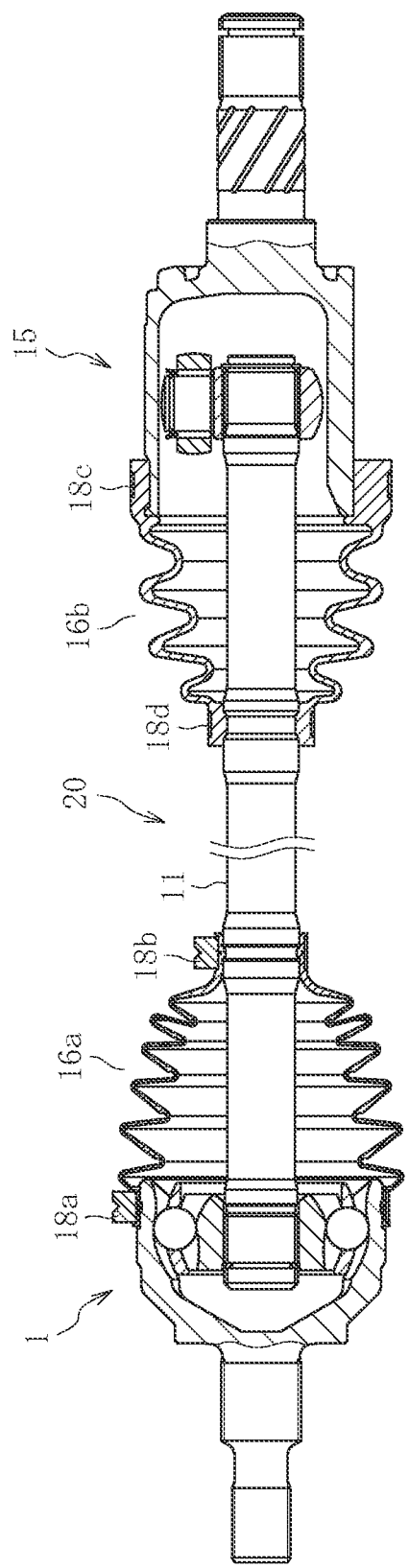
FIG. 13 is a view of a state in which the fixed type constant velocity universal joint of FIGS. 1a and 1b is used in an automotive drive shaft.

FIG. 13 illustrates an automotive front drive shaft 20, to which the fixed type constant velocity universal joint 1 according to this embodiment is applied. The fixed type constant velocity universal joint 1 is coupled to one end of an intermediate shaft 11, and a plunging tripod type constant velocity universal joint 15 is coupled to another end thereof. At positions between an outer peripheral surface of the fixed type constant velocity universal joint 1 and an outer peripheral surface of the shaft 11 and between an outer peripheral surface of the plunging tripod type constant velocity universal joint 15 and the outer peripheral surface of the shaft 11, bellows boots 16a and 16b are fastened and fixed with boot bands 18a, 18b, 18c, and 18d. Grease is sealed inside the joint as a lubricant. Through use of the fixed type constant velocity universal joint 1 according to this embodiment, it is possible to attain a lightweight and compact automotive drive shaft 20 that is suppressed in torque loss and heat generation, enhanced in efficiency, and is capable of forming high operating angles and effectively absorbing vibration with small amplitude. When the drive shaft 20 is mounted to an automobile, this automobile can be suppressed in fuel consumption due to improvement in transmission efficiency and reduced in noise, vibration, and harshness (NVH).

Figure 14:
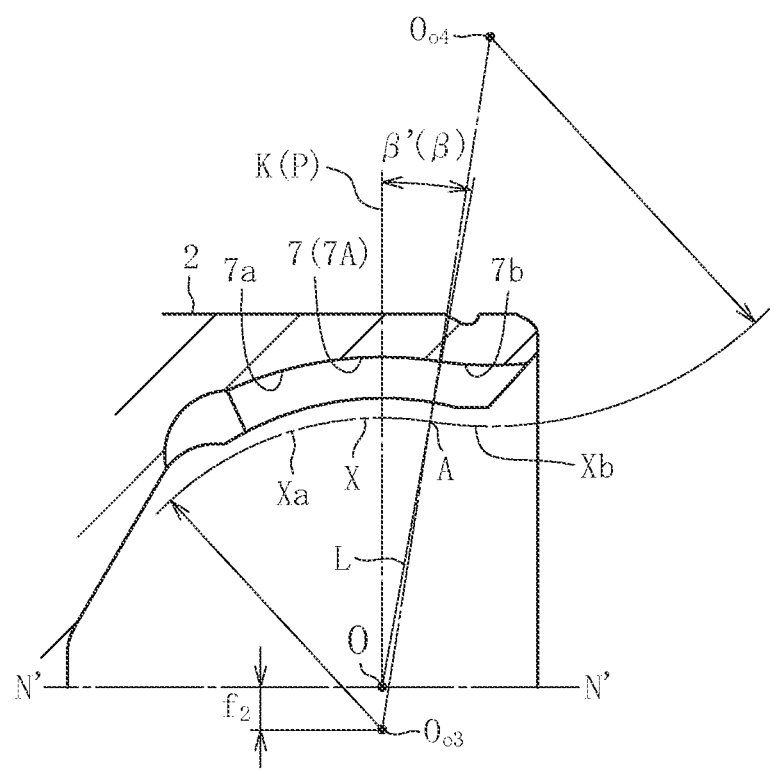
FIG. 14 is a vertical sectional view of an outer joint member of a fixed type constant velocity universal joint according to a second embodiment of the present invention.

Description is given of a fixed type constant velocity universal joint according to a second embodiment of the present invention with reference to FIG. 14. FIG. 14 is a sectional view similar to FIG. 4, for illustrating only an outer joint member of the fixed type constant velocity universal joint according to this embodiment. The fixed type constant velocity universal joint is different from the fixed type constant velocity universal joint according to the first embodiment described above in that the curvature centers of the arc-shaped ball raceway center lines of the first track groove portions are not offset in the axial direction with respect to the joint center O, but offset in the radial direction with respect to the joint axial line N-N, and that the structures of the arc-shaped ball raceway center lines of the second track groove portions are adjusted along with the above-mentioned offset. Other structural details are the same as those of the first embodiment. Also in this embodiment, parts having similar functions to those of the first embodiment are represented by the same reference symbols to omit redundant description thereof.

The end portion A on the opening side of the ball raceway center line Xa of the first track groove portion 7a of the outer joint member 2 is the same as that of the first embodiment. However, a curvature center $O_{o3}$ of the ball raceway center line Xa of the first track groove portion 7a is not offset in the axial direction with respect to the joint center O, but is offset by $f_2$ in the radial direction with respect to the joint axial line N-N. That is, the curvature center $O_{o3}$ is offset by $f_2$ in the radial direction in the plane P including the joint center O and the perpendicular line K and being perpendicular to the axial line N-N at the operating angle of 0°. Along with this, a position of a curvature center $O_{o4}$ of the ball raceway center line Xb of the second track groove portion 7b is adjusted so that the ball raceway center line Xb is smoothly connected to the ball raceway center line Xa of the first track groove portion 7a. With this structure, track groove depths on the interior side of the joint can be adjusted. Although illustration is omitted, also in the fixed type constant velocity universal joint according to this embodiment, the ball raceway center line Y of the track groove 9 of the inner joint member 3 is formed so as to be mirror-image symmetrical with the ball raceway center line X of the paired track groove 7 of the outer joint member 2 with respect to the plane P including the joint center O and being perpendicular to the joint axial line N-N at the operating angle of 0°. The inclined state in the peripheral direction of the track grooves 7 and 9 of the outer joint member 2 and the inner joint member 3 with respect to the joint axial line N-N, the effects by the cage and the joint, the structure for absorbing vibration with small amplitude, and the effects thereby are the same as those in the fixed type constant velocity universal joint according to the first embodiment, and hence redundant description thereof is omitted.

FIGS. 15a to 23b illustrate a third embodiment of the present invention. A fixed type constant velocity universal joint according to this embodiment is different from the fixed type constant velocity universal joint according to the first embodiment in that the second track groove portions are formed into a straight shape. With this, at a maximum operating angle, the effective track length is secured, and formation of excessively high wedge angles is suppressed. Other structural details are the same as those of the first embodiment, and hence parts having similar functions are represented by the same reference symbols.

FIGS. 15a and 15b illustrate the fixed type constant velocity universal joint according to this embodiment. FIG. 15a is a partial vertical sectional view taken along the line C-O-C in FIG. 15b, and FIG. 15b is a right-hand side view of FIG. 15a. The constant velocity universal joint 1 mainly comprises the outer joint member 2, the inner joint member 3, the balls 4, and the cage 5. As illustrated in FIGS. 15b-17c, respective eight track grooves 7 and 9 of the outer joint member 2 and the inner joint member 3 respectively comprise the track grooves 7A and 7B and the track grooves 9A and 9B that are inclined in the peripheral direction with respect to the joint axial line N-N and adjacent to each other in the peripheral direction with their inclination directions opposite to each other. Eight balls 4 are arranged in crossing portions of the paired track grooves 7A and 9A and the paired track grooves 7B and 9B of the outer joint member 2 and the inner joint member 3. FIG. 15a illustrates the track grooves 7 and 9 under a state in which cross sections thereof in the plane M illustrated in FIG. 16a and the plane Q illustrated in FIG. 17b are rotated at an inclination angle γ of 0°. The directions of the arrows D and E in FIG. 15b correspond to the viewing directions just as those in FIG. 1b in the first embodiment, which correspond also to those of the illustrations of FIGS. 6a to 10.

As illustrated in FIG. 15a, each track groove 7 of the outer joint member 2 has the ball raceway center line X. The track groove 7 comprises the first track groove portion 7a having an arc-shaped ball raceway center line Xa about a curvature center at the joint center O, and the second track groove portion 7b having a straight ball raceway center line Xb. The ball raceway center line Xb of the second track groove portion 7b is smoothly connected as a tangent to the ball raceway center line Xa of the first track groove portion 7a. On the other hand, each track groove 9 of the inner joint member 3 has the ball raceway center line Y. The track groove 9 comprises the first track groove portion 9a having an arc-shaped ball raceway center line Ya about a curvature center at the joint center O, and the second track groove portion 9b having a straight ball raceway center line Yb. The ball raceway center line Yb of the second track groove portion 9b is smoothly connected as a tangent to the ball raceway center line Ya of the first track groove portion 9a.

Figure 16B:
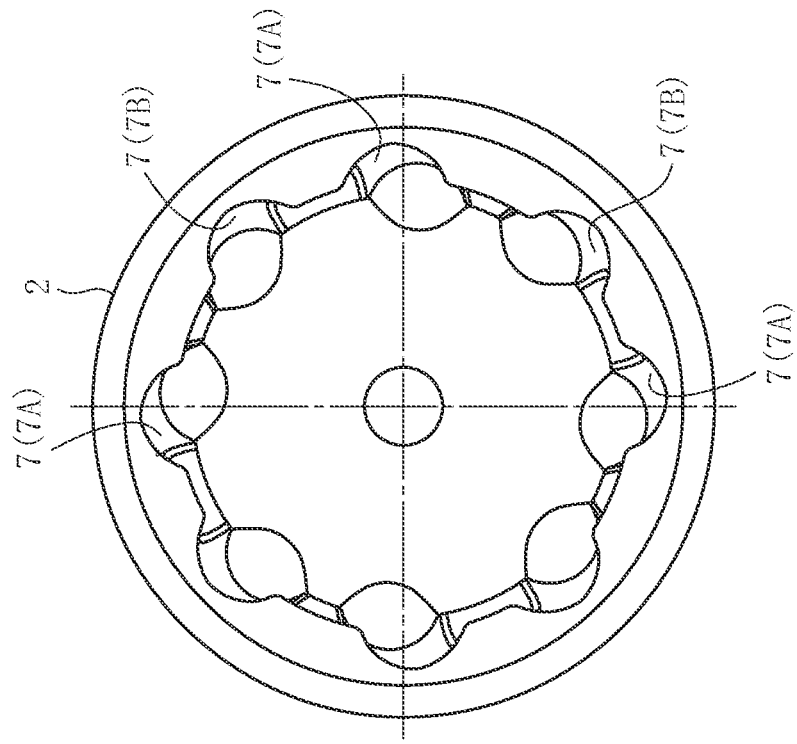
FIG. 16b is a right-hand side view of the outer joint member of the fixed type constant velocity universal joint of FIGS. 15a and 15b.
Figure 16A:
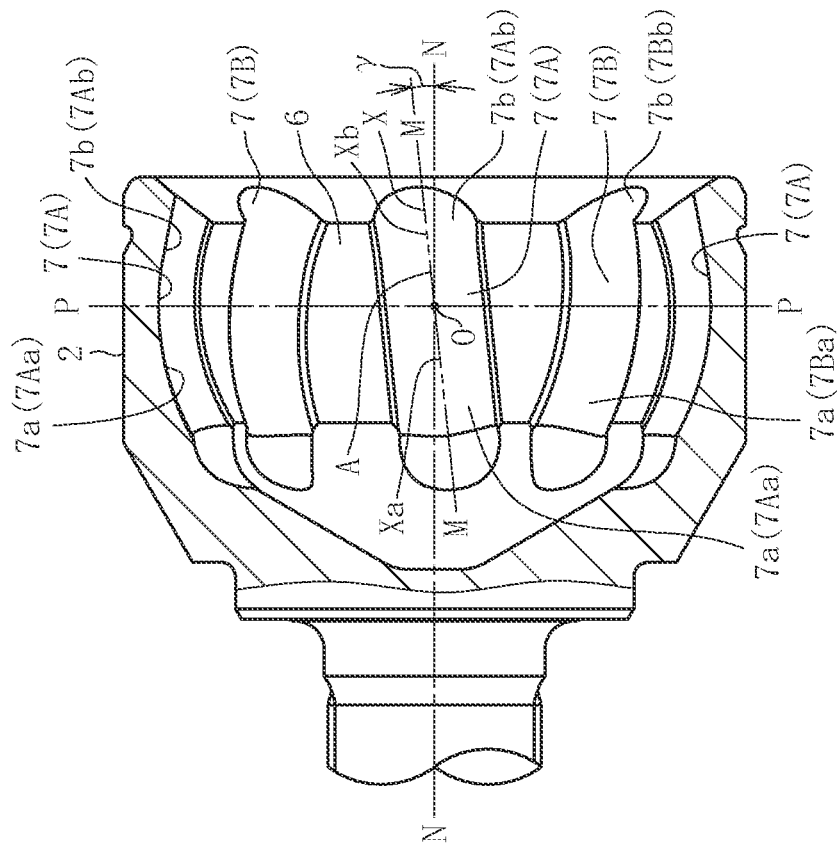
FIG. 16a is a partial vertical sectional view of an outer joint member of the fixed type constant velocity universal joint of FIGS. 15a and 15b.

FIGS. 16a and 16b illustrate a state in which the track grooves 7 of the outer joint member 2 are inclined in the peripheral direction with respect to the joint axial line N-N. FIG. 16a is a partial vertical sectional view of the outer joint member 2, and FIG. 16b is a right-hand side view of the outer joint member 2. The inclined state of the track grooves 7 of the outer joint member 2 is the same as that of the first embodiment, and hence redundant description thereof is omitted.

Figure 17A:
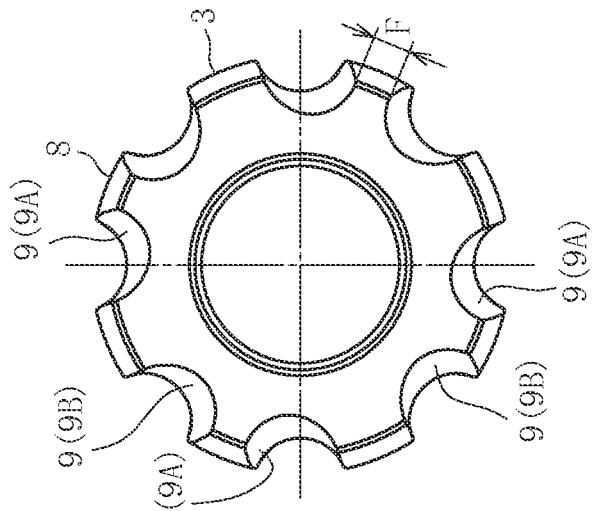
FIG. 17a is a left-hand side view of an inner joint member of the fixed type constant velocity universal joint of FIGS. 15a and 15b.
Figure 17B:
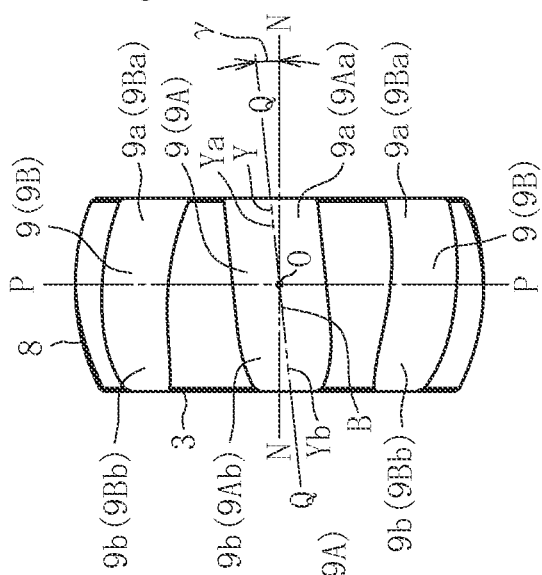
FIG. 17b is a view of an outer peripheral surface of the inner joint member of the fixed type constant velocity universal joint of FIGS. 15a and 15b.
Figure 17C:
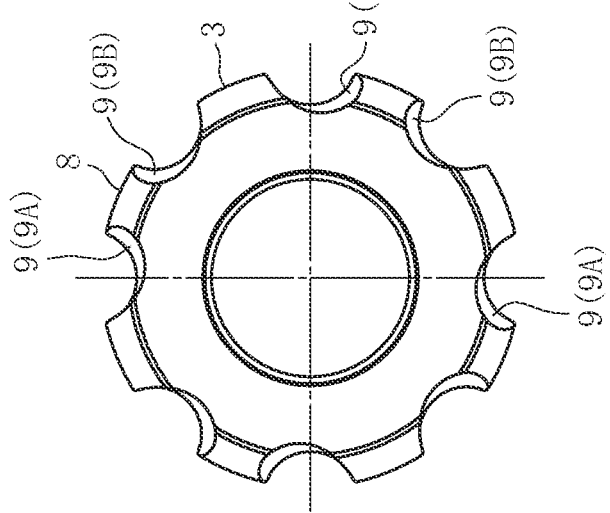
FIG. 17c is a right-hand side view of the inner joint member of the fixed type constant velocity universal joint of FIGS. 15a and 15b.

FIGS. 17a-17c illustrate a state in which the track grooves 9 of the inner joint member 3 are inclined in the peripheral direction with respect to the joint axial line N-N. FIG. 17b illustrates an outer peripheral surface of the inner joint member 3, FIG. 17a is a left-hand side view of the inner joint member 3, and FIG. 17c is a right-hand side view of the inner joint member 3. The inclined state of the track grooves 9 of the inner joint member 3 is the same as that of the first embodiment, and hence redundant description thereof is omitted.

Figure 18:
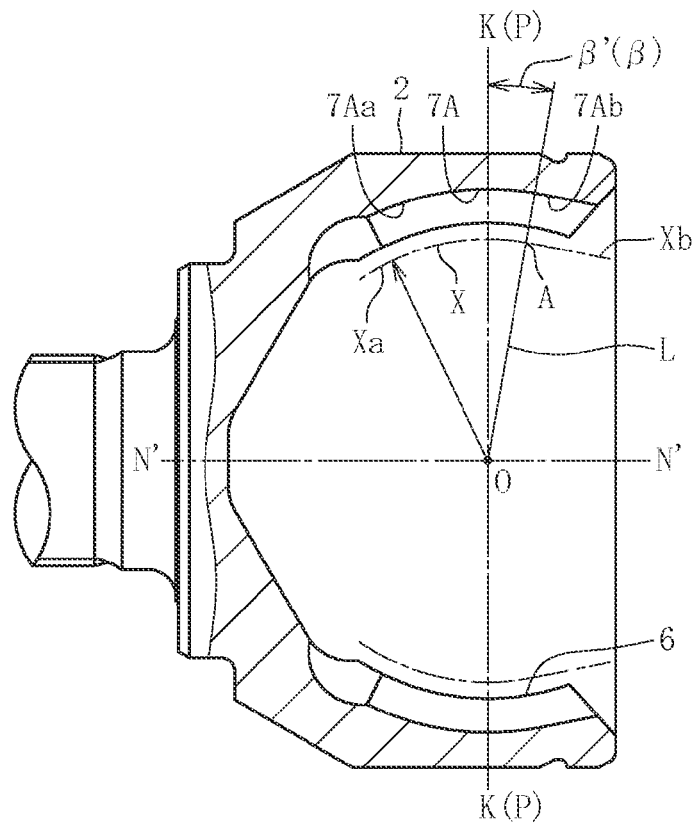
FIG. 18 is a partial vertical sectional view of details of track grooves of the outer joint member.

FIG. 18 illustrates details of the track grooves when viewed in the vertical cross section of the outer joint member 2. FIG. 18 is a sectional view of a partial vertical cross section in the plane M of FIG. 16a, which includes the ball raceway center line X of the track groove 7A and the joint center O. FIG. 18 also illustrates the track groove 7A of the outer joint member 2. Detailed description of the track groove 7B is omitted because the inclination direction of the track groove 7B is merely opposite to that of the track groove 7A and other structural details of the track groove 7B are the same as those of the track groove 7A. In the spherical inner peripheral surface 6 of the outer joint member 2, the track grooves 7A are formed along the axial direction. The track grooves 7A each have the ball raceway center line X, and each comprise the first track groove portion 7Aa having the arc-shaped ball raceway center line Xa about the curvature center at the joint center O (not offset in the axial direction), and the second track groove portion 7Ab having the straight ball raceway center line Xb. In addition, the straight ball raceway center line Xb of the second track groove portion 7Ab is smoothly connected as a tangent to the end portion A on the opening side of the ball raceway center line Xa of the first track groove portion 7Aa. The end portion A is positioned on the opening side with respect to the joint center O. Thus, the straight ball raceway center line Xb of the second track groove portion 7Ab, which is connected as a tangent to the end portion A on the opening side of the ball raceway center line Xa of the first track groove portion 7Aa, is formed to come closer to the joint axial line N-N (see FIG. 15a) as the distance to the opening side becomes smaller. With this, at a maximum operating angle, an effective track length can be secured, and formation of excessively high wedge angles can be suppressed.

Also in this embodiment, L represents the straight line connecting the end portion A and the joint center O. The angle β formed by the straight line L with respect to the plane P including the joint center O and being perpendicular to the joint axial line N-N at the operating angle of 0° is the same as that of the first embodiment, and hence redundant description thereof is omitted.

Figure 19:
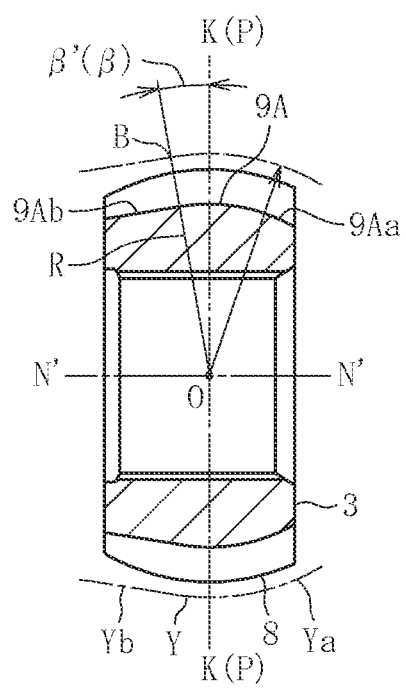
FIG. 19 is a vertical sectional view of details of track grooves of the inner joint member.

Similarly, FIG. 19 illustrates details of the track grooves in the vertical cross section of the inner joint member 3. FIG. 19 is a sectional view of a vertical cross section in the above-mentioned plane Q of FIG. 17b, which includes the ball raceway center line Y of the track groove 9A and the joint center O. FIG. 19 illustrates the track groove 9A of the inner joint member 3. Detailed description of the track groove 9B is omitted because the inclination direction of the track groove 9B is merely opposite to that of the track groove 9A and other structural details of the track groove 9B are the same as those of the track groove 9A. In the spherical outer peripheral surface 8 of the inner joint member 3, the track grooves 9A are formed along the axial direction. The track grooves 9A each have the ball raceway center line Y, and each comprise the first track groove portion 9Aa having the arc-shaped ball raceway center line Ya about the curvature center at the joint center O (not offset in the axial direction), and the second track groove portion 9Ab having the straight ball raceway center line Yb. In addition, the ball raceway center line Yb of the second track groove portion 9Ab is smoothly connected as a tangent to the end portion B on the interior side of the ball raceway center line Ya of the first track groove portion 9Aa. That is, the end portion B is a connecting point between the first track groove portion 9Aa and the second track groove portion 9Ab. The end portion B is positioned on the interior side with respect to the joint center O. Thus, the straight ball raceway center line Yb of the second track groove portion 9Ab, which is connected as a tangent to the end portion B on the interior side of the ball raceway center line Ya of the first track groove portion 9Aa, is formed to come closer to the joint axial line N-N (see FIG. 15a) as the distance to the interior side becomes smaller. With this, at a maximum operating angle, the effective track length can be secured, and formation of excessively high wedge angles can be suppressed.

Also in this embodiment, R represents the straight line connecting the end portion B and the joint center O. The angle β formed by the straight line R with respect to the plane P including the joint center O and being perpendicular to the joint axial line N-N at the operating angle of 0° is the same as that of the first embodiment, and hence redundant description thereof is omitted.

Figure 20:
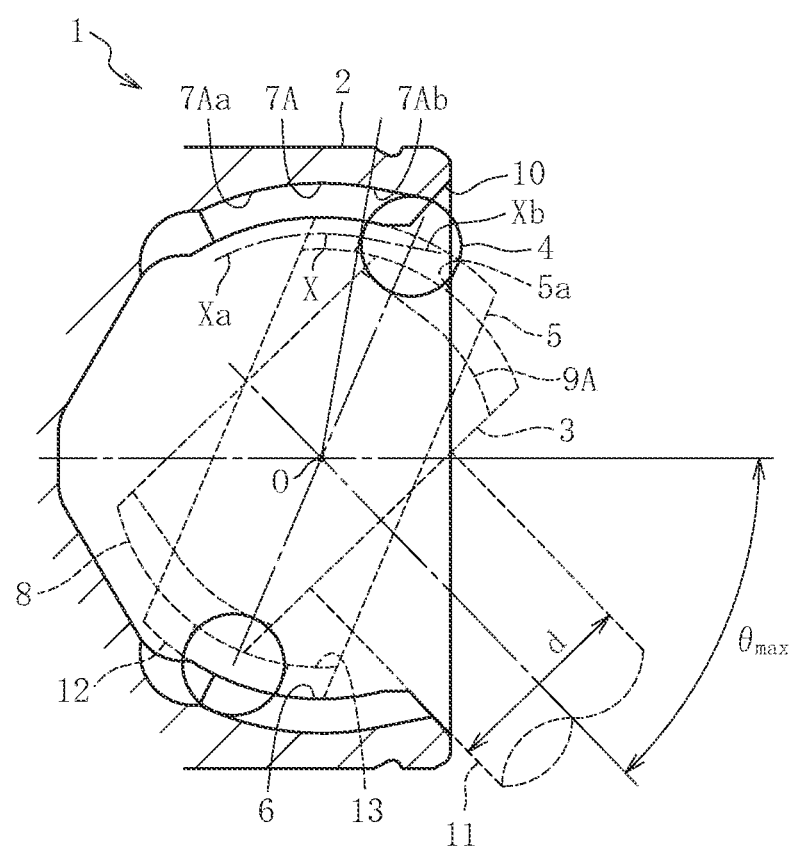
FIG. 20 is a schematic view of a state in which the joint forms a maximum operating angle.

FIG. 20 illustrates a state in which the constant velocity universal joint according to this embodiment forms a maximum operating angle. In the track groove 7A of the outer joint member 2, the second track groove portion 7Ab having the straight ball raceway center line Xb is formed on the opening side. Irrespective of the compact design, by forming the second track groove portion 7Ab, at the maximum operating angle, the effective track length can be secured, and formation of excessively high wedge angles can be suppressed. Thus, as illustrated in FIG. 20, even in a case where the maximum operating angle $\theta_{max}$ is set as high as approximately 50° and the inlet chamfer 10 having a necessary and sufficient size is formed, the ball 4 and the second track groove portion 7Ab can be reliably held in contact, and formation of high wedge angles can be suppressed.

Figure 21B:
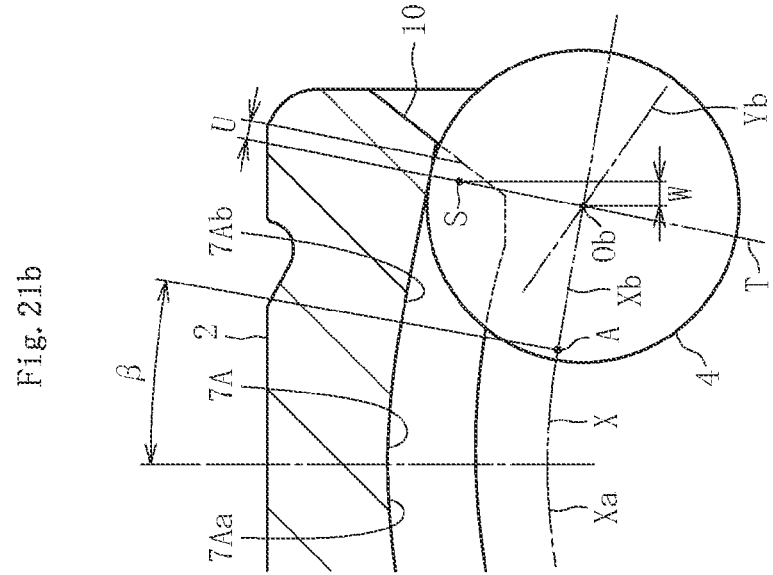
Figure 21A:
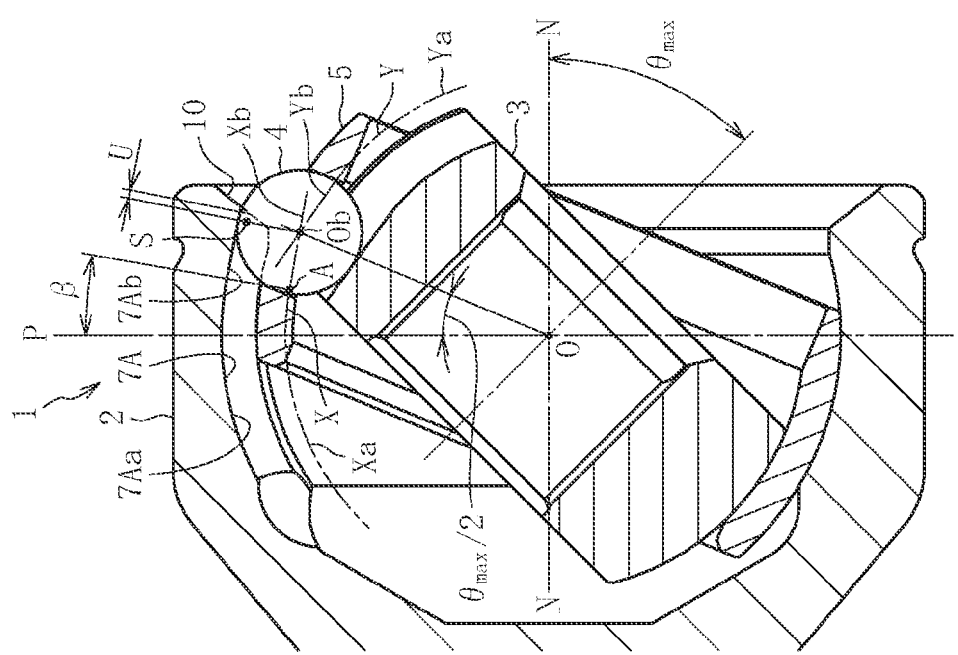
FIG. 21a is a view of a contact state between a ball and the track grooves under the state in which the joint forms the maximum operating angle.

Further, referring to FIGS. 21a and 21b, detailed description is given of a contact state between the track grooves and the ball at the maximum operating angle of the constant velocity universal joint according to this embodiment. FIG. 21a is a vertical sectional view of the constant velocity universal joint 1, and FIG. 21b is an enlarged view of a contact state between the track groove 7A of the outer joint member 2 and the ball 4. FIG. 21b also illustrates the track groove 7A of the outer joint member 2. Detailed description of the track groove 7B is omitted because the inclination direction of the track groove 7B is merely opposite to that of the track groove 7A and other structural details of the track groove 7B are the same as those of the track groove 7A. As illustrated in FIG. 21a, when the joint forms the maximum operating angle $\theta_{max}$, a center Ob of the ball 4 moves to a position of $\theta_{max}/2$ with respect to the plane P including the joint center O and being perpendicular to the joint axial line N-N at the operating angle of 0°. At this time, a contact point S between the ball 4 and the second track groove portion 7Ab comes closest to the inlet chamfer 10. The straight ball raceway center line Xb of the second track groove portion 7Ab is connected as a tangent to the end portion A of the arc-shaped ball raceway center line Xa of the first track groove portion 7Aa. Thus, in the vertical cross section of FIG. 21a, the ball raceway center line Xb is inclined in a direction that comes closer to the joint axial line N-N as the distance to the opening side of the outer joint member 2 becomes smaller.

Figure 30A:
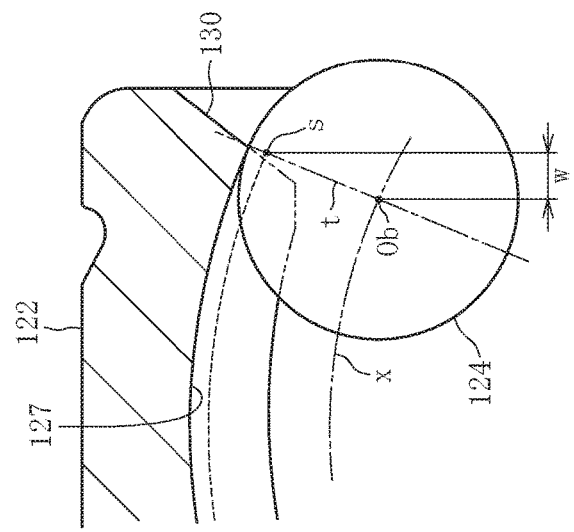
FIG. 30a is a schematic view of a state in which the fixed type constant velocity universal joint of FIG. 29 forms a high operating angle.
Figure 30B:
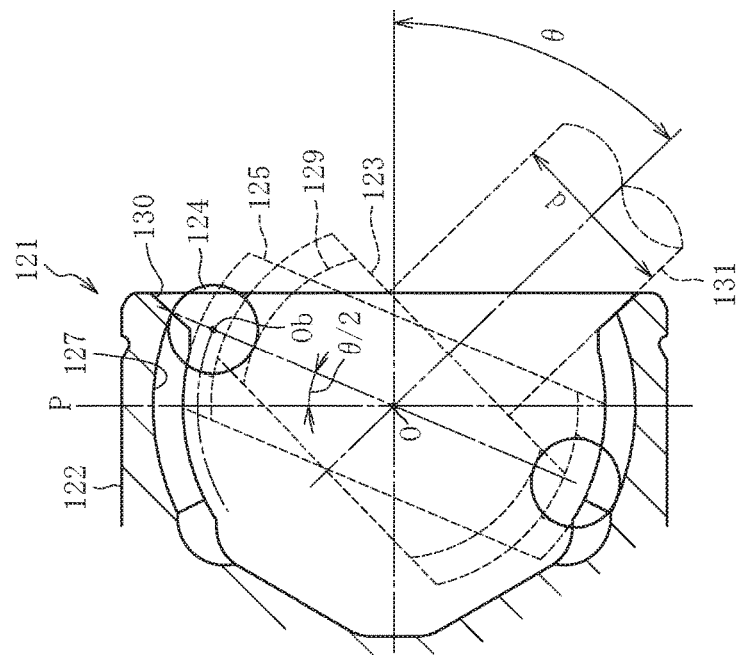

As illustrated on an enlarged scale in FIG. 21b, the contact point S between the ball 4 and the second track groove portion 7Ab is positioned in a plane T that passes through the center Ob of the ball 4 and is orthogonal to the ball raceway center line Xb. The ball raceway center line Xb is straight, and hence an axial distance W between the center Ob of the ball 4 and the contact point S is smaller than that of a related-art constant velocity universal joint illustrated in FIG. 30b. Accordingly, the effective track length is increased. Thus, in this embodiment, at the maximum operating angle, a track allowance amount U can be secured between an edge portion of the inlet chamfer 10 and the contact point S, and the contact state between the ball 4 and the second track groove portion 7Ab can be sufficiently secured.

As described above, depending on the shape of the track groove 7, the contact point S between the track groove 7 of the outer joint member 2 and the ball 4 varies in position in the axial direction of the joint. Thus, in this specification and Scope of Claims, the effective track length at the maximum operating angle refers to a length of a trajectory of the contact point between the ball and the track groove in consideration of the variation in position in the axial direction of the contact point S as described above.

Figure 22B:
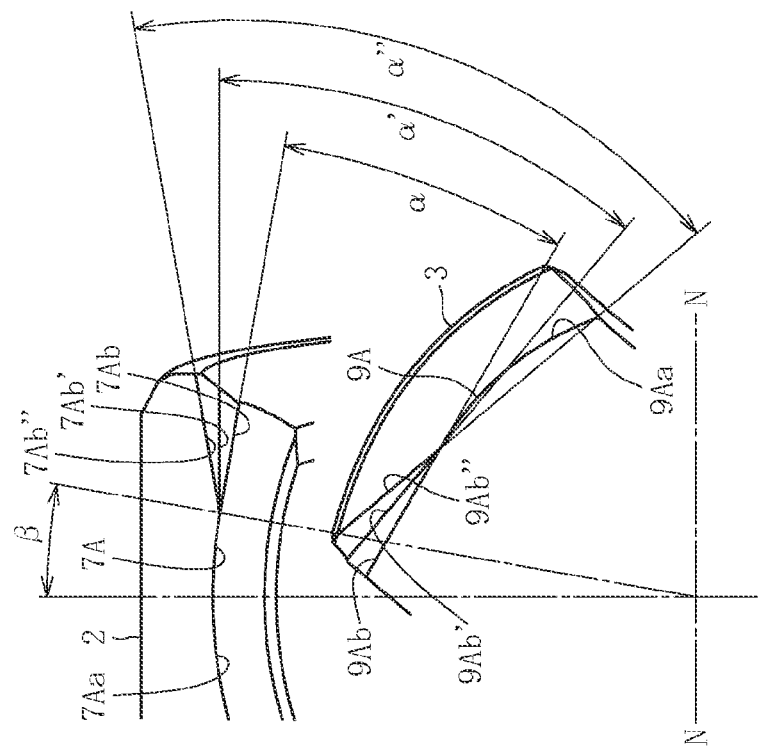
Figure 22A:
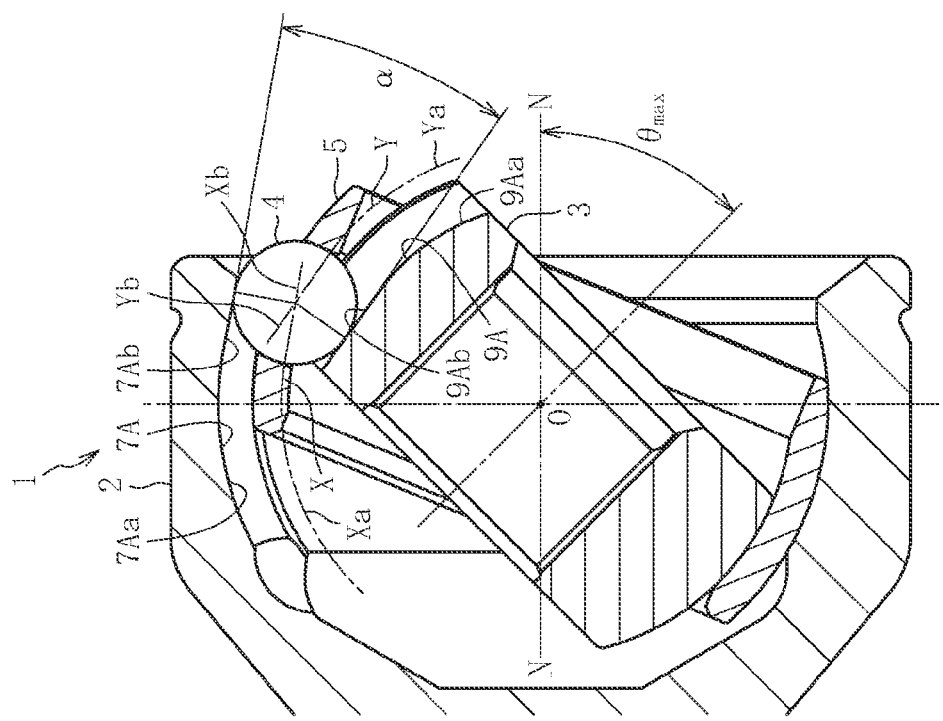
FIG. 22a is a view of a wedge angle under the state in which the joint forms the maximum operating angle.

Next, a feature of the constant velocity universal joint according to this embodiment, that is, a state of wedge angles at the maximum operating angle is described with reference to FIGS. 22a and 22b. FIG. 22a is a vertical sectional view of the constant velocity universal joint 1, and FIG. 22b is an enlarged view of states of wedge angles between the track groove 7A (7Ab) of the outer joint member 2 and the track groove 9A (9Ab) of the inner joint member 3. FIGS. 22a and 22b also illustrate the track groove 7A of the outer joint member 2. Detailed description of the track groove 7B is omitted because the inclination direction of the track groove 7B is merely opposite to that of the track groove 7A and other structural details of the track groove 7B are the same as those of the track groove 7A. In the constant velocity universal joint 1 according to this embodiment, the track grooves 7A and 9A and the balls 4 are held in angular contact at a contact angle, and the ball raceway center lines X and Y of the track grooves 7A and 9A (see FIGS. 16a and 17b) each form an inclination angle γ. Thus, in this specification, the wedge angle between the track grooves refers to an actual wedge angle between contact points of the ball and the track grooves. However, in the illustration, the wedge angle is simplified through use of groove bottoms of the track grooves 7A and 9A.

Figure 25:
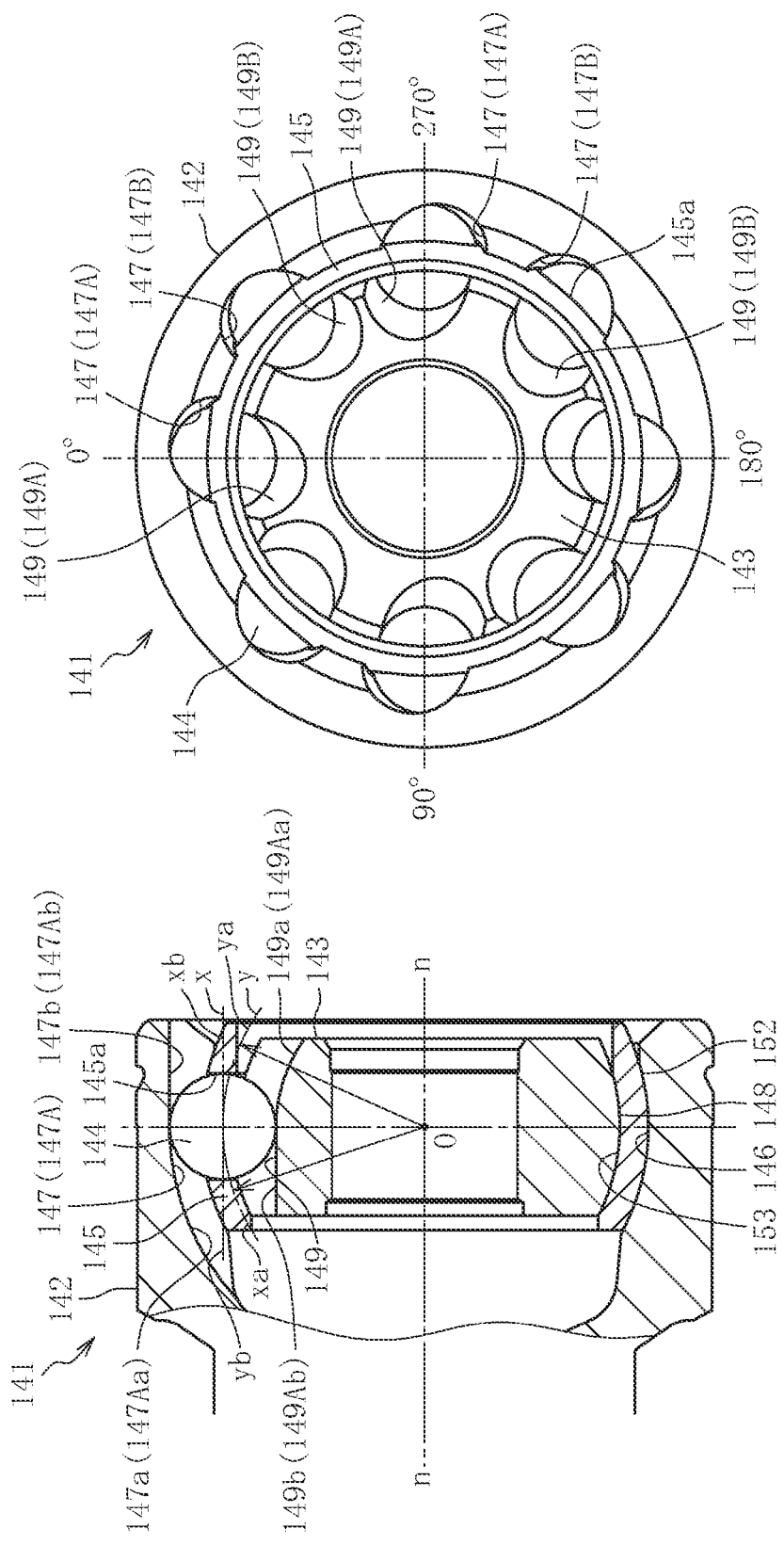
Figure 26:
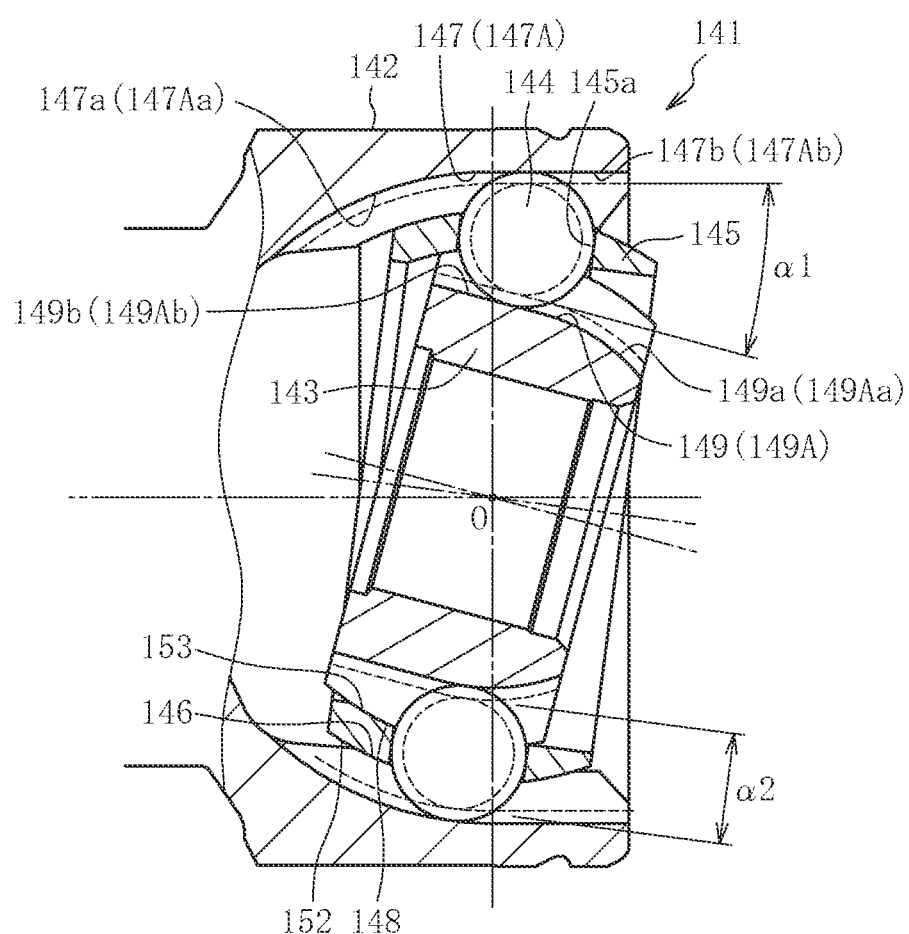
FIG. 26 is a view illustrating the technical findings in the process to arrive at the present invention.
Figure 27A:
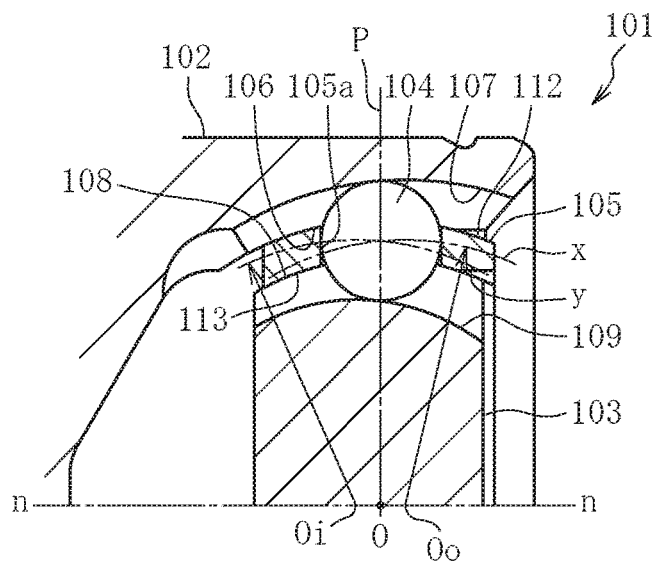
FIG. 27a is a vertical sectional view of a related-art fixed type constant velocity universal joint
Figure 27B:
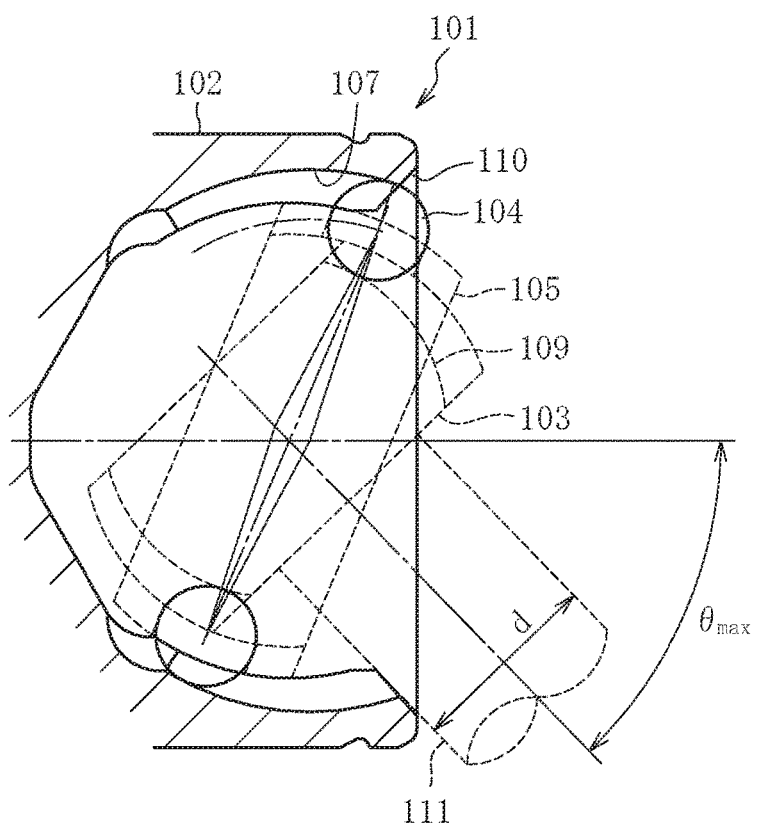
FIG. 27b is a schematic view of a state in which the fixed type constant velocity universal joint of FIG. 27a forms a maximum operating angle.
Figure 28:
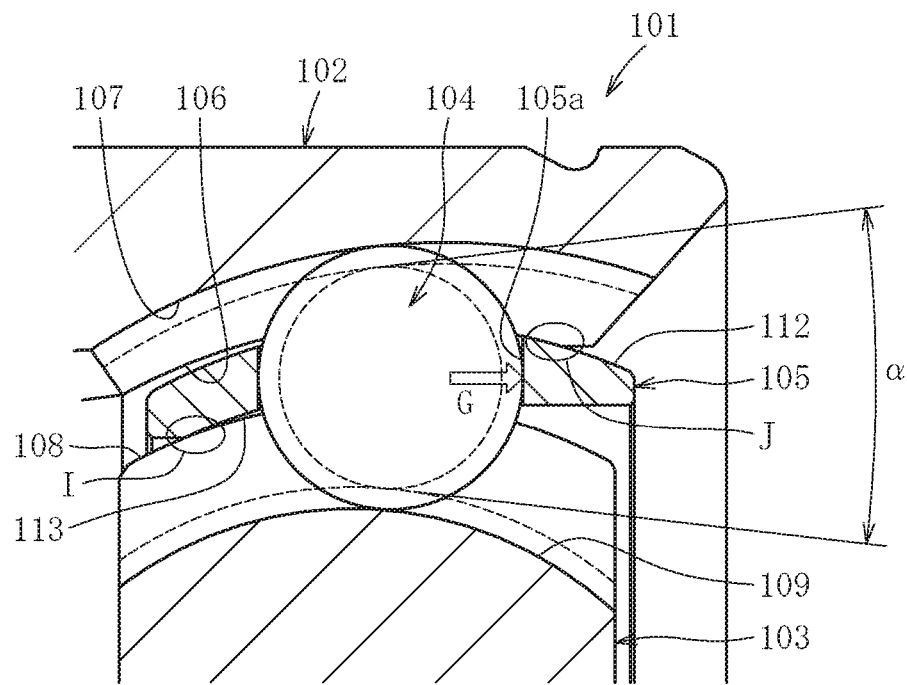
FIG. 28 is a vertical sectional view of a state of spherical surface contact.
Figure 29:
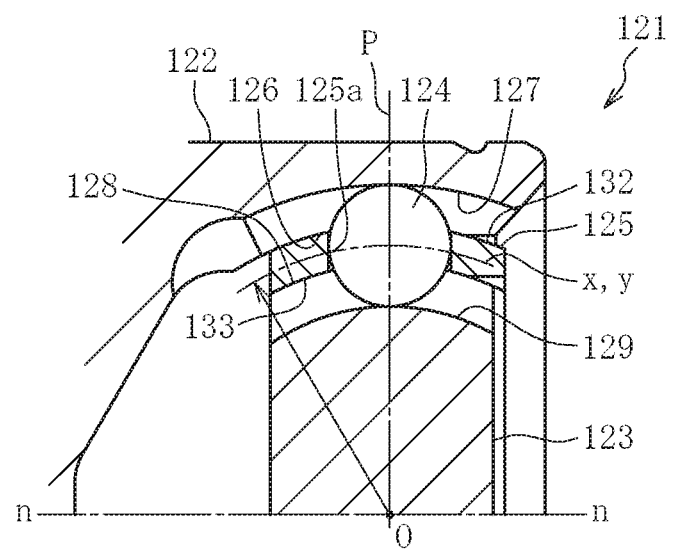
FIG. 29 is a vertical sectional view of a related-art fixed type constant velocity universal joint.

As illustrated in FIG. 22a, a wedge angle α between the track grooves 7A and 9A at the maximum operating angle $\theta_{max}$ of the constant velocity universal joint 1 according to this embodiment becomes highest when a phase angle in a rotation direction ranges from 300° to 360° (see FIG. 25b). The straight ball raceway center line Xb of the second track groove portion 7Ab of the outer joint member 2 is connected as a tangent to the end portion A of the arc-shaped ball raceway center line Xa of the first track groove portion 7Aa. Thus, at the operating angle of 0°, in the illustrated vertical cross section, the ball raceway center line Xb is inclined in the direction that comes closer to the joint axial line N-N as the distance to the opening side of the outer joint member 2 becomes smaller. On the other hand, the straight ball raceway center line Yb of the second track groove portion 9Ab of the inner joint member 3 is inclined in an opposite direction to that of the straight ball raceway center line Xb of the outer joint member 2. Thus, the second track groove portions 7Ab and 9Ab are formed to come closer to each other toward the opening side at the operating angle of 0°. Thus, the wedge angle α formed at the maximum operating angle can be decreased. As a result, a pop-out force of the ball 4 sandwiched between the straight second track groove portions 7Ab and 9Ab toward the opening side is decreased. Accordingly, the pocket loads of the cage 5 are decreased, and the strength of the cage 5 at the high operating angles can be secured.

How the wedge angle α at the maximum operating angle can be decreased is described in detail with reference to FIG. 22b. In FIG. 22b, the second track groove portions of the outer joint member 2 and the inner joint member 3 of the constant velocity universal joint 1 according to this embodiment are represented by 7Ab and 9Ab. In addition, second track groove portions of investigated Comparative Example 1 are represented by 7Ab' and 9Ab', and second track groove portions of investigated Comparative Example 2 are represented by 7Ab" and 9Ab". In the constant velocity universal joint 1 according to this embodiment, as described above, the second track groove portions 7Ab and 9Ab are formed to come closer to each other toward the opening side at the operating angle of 0°. Along with this, the decreased wedge angle α is formed at the maximum operating angle. On the other hand, in Comparative Example 1, groove bottoms of the second track groove portions 7Ab' and 9Ab' are formed parallel to each other at the operating angle of 0° in a cross section of FIG. 22b. Thus, a higher wedge angle α' is formed at the maximum operating angle. Further, in Comparative Example 2, groove bottoms of the second track groove portions 7Ab" and 9Ab" are formed apart from each other as the distance to the opening side of the outer joint member 2 becomes smaller at the operating angle of 0°. Thus, an even higher wedge angle α" is formed at the maximum operating angle. In this way, in the constant velocity universal joint 1 according to this embodiment, the wedge angle α at the maximum operating angle can be decreased as compared to those in Comparative Examples 1 and 2. As described above, the effective track length is larger in Comparative Examples 1 and 2. However, it is preferred that the fixed type constant velocity universal joint according to this embodiment be practically employed because, at the maximum operating angle, the effective track length can be secured and the wedge angle can be suppressed.

FIGS. 23a and 23b are perspective views of the outer joint member 2 and the inner joint member 3 of the constant velocity universal joint according to this embodiment. Those perspective views are similar to those in the first embodiment. Further, the effects by the cage and the joint, the structure for absorbing vibration with small amplitude, and the effects thereby are the same as those in the fixed type constant velocity universal joint according to the first embodiment, and hence redundant description thereof is omitted.

Figure 24:
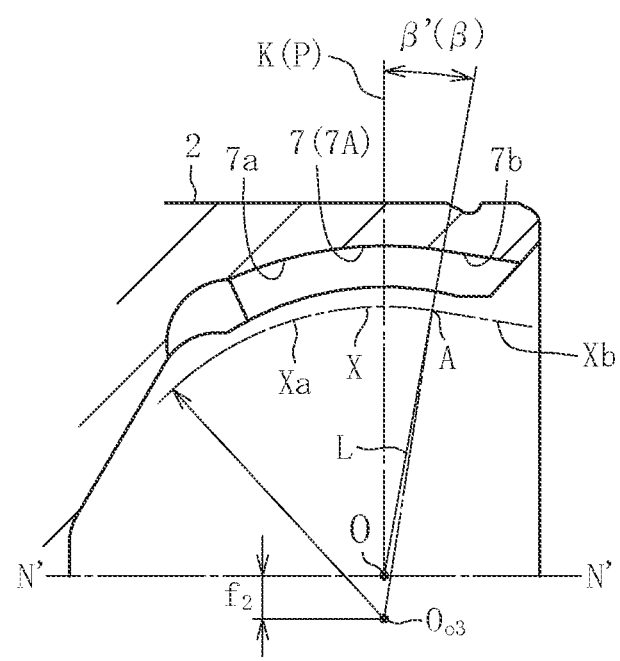
FIG. 24 is a vertical sectional view of an outer joint member of a fixed type constant velocity universal joint according to a fourth embodiment of the present invention.

Description is given of a fixed type constant velocity universal joint according to a fourth embodiment of the present invention with reference to FIG. 24. FIG. 24 is a sectional view similar to FIG. 18, for illustrating only an outer joint member of the fixed type constant velocity universal joint according to this embodiment. The fixed type constant velocity universal joint is different from the fixed type constant velocity universal joint according to the third embodiment described above in that the curvature centers of the arc-shaped ball raceway center lines of the first track groove portions are offset in the radial direction with respect to the joint axial line N-N, and that the structures of the straight ball raceway center lines of the second track groove portions are adjusted along with the above-mentioned offset. Other structural details are the same as those of the third embodiment. Also in this embodiment, parts having similar functions to those of the first and third embodiments are represented by the same reference symbols to omit redundant description thereof.

The end portion A on the opening side of the ball raceway center line Xa of the first track groove portion 7a of the outer joint member 2 is the same as that of the first embodiment. However, the curvature center $O_{o3}$ of the ball raceway center line Xa of the first track groove portion 7a is not offset in the axial direction with respect to the joint center O, but is offset by $f_2$ in the radial direction with respect to the joint axial line. Along with this, the straight ball raceway center line Xb of the second track groove portion 7b is adjusted so as to be connected as a tangent to the end portion A on the opening side of the ball raceway center line Xa of the first track groove portion 7a. With this structure, track groove depths on the interior side of the joint can be adjusted. Although illustration is omitted, also in the fixed type constant velocity universal joint according to this embodiment, the ball raceway center line Y of the track groove 9 of the inner joint member 3 is formed so as to be mirror-image symmetrical with the ball raceway center line X of the paired track groove 7 of the outer joint member 2 with respect to the plane P including the joint center O and being perpendicular to the joint axial line N-N at the operating angle of 0°. The inclined state in the peripheral direction of the track grooves 7 and 9 of the outer joint member 2 and the inner joint member 3 with respect to the joint axial line N-N, the effects by the cage and the joint, the structure for absorbing vibration with small amplitude, and the effects thereby are the same as those in the fixed type constant velocity universal joint according to the first and third embodiments, and hence redundant description thereof is omitted.

The fixed type constant velocity universal joints 1 according to the embodiments described above have the structural advantage of the crossing track grooves. Thus, the spherical contact between the cage 5 and both the outer joint member 2 and the inner joint member 3 can be suppressed, and hence the effect of suppressing friction loss can be obtained. In addition, based on the feature that the actual wedge angles 2γ' between the contact points between the ball and the track grooves remain unchanged irrespective of the axial position of the ball, the axial clearances between the inner joint member and the cage are each set to be larger than the axial clearance formed by the clearances between the ball and the track grooves, which provides the additional effect that vibration with small amplitude can effectively be absorbed. Synergistically by those effects, it is possible to attain a fixed type constant velocity universal joint that is suppressed in torque loss and heat generation, markedly enhanced in efficiency, has a prolonged life due to the less heat generation, and is compactified. The fixed type constant velocity universal joint is also capable of forming high operating angles, excellent in strength and durability at the high operating angles, and in addition, suited to reduce noise, vibration, and harshness (NVH) of a vehicle.

In the fixed type constant velocity universal joints according to the embodiments described above, the number of the balls 4 is set to eight. However, the present invention is not limited thereto. It is preferred that the number of the balls be set to ten, or the present invention may be appropriately carried out in such an embodiment that the number of the balls is set to twelve.

Further, in the fixed type constant velocity universal joint according to the embodiments described above, the ball raceway center line Xb of the second track groove portion is formed into an arc shape or a straight shape. However, the present invention is not limited thereto. It is only necessary that the shape of the ball raceway center line Xb of the second track groove portion be different from that of the ball raceway center line Xa of the first track groove portion so as to increase the effective track length and therefore achieve high operating angles. Under this condition, any shape may be employed as appropriate, and for example, an elliptical shape may be employed as well. Further, the first track groove portion and the second track groove portion are not limited to the single arc, and may each be formed of a plurality of arcs in consideration of the track groove depths and the like. Still further, in the above description, the track grooves are arranged at a regular pitch in the peripheral direction, but the track grooves may be arranged at an irregular pitch. Yet further, the inclination angles γ of the first track groove portions with respect to the joint axial line N-N are set equal to each other in all the track grooves, but the present invention is not limited thereto. The inclination angles γ of the paired first track groove portions and other paired first track groove portions of the outer joint member and the inner joint member may be set unequal to each other. It is only necessary that the inclination angles be set so that the axial forces of the balls are applied in a balanced manner as a whole to all the pocket portions of the cage in the peripheral direction. In addition, in the embodiments described above, the track grooves and the balls are held in angular contact at a contact angle. However, the present invention is not limited thereto. The track grooves and the balls may be held in circular contact by forming the track grooves into a circular shape in horizontal cross section.

The present invention is not limited to the embodiments described above, and as a matter of course, may be carried out in various other embodiments without departing from the spirit of the present invention. The scope of the present invention is defined in the claims, and encompasses meaning of equivalents of elements described in the claims and all modifications within the scope of claims.

DESCRIPTION OF REFERENCE SIGNS 1 fixed type constant velocity universal joint
2 outer joint member
3 inner joint member
4 ball
5 cage
6 spherical inner peripheral surface
7 track groove
7a first track groove portion
7b second track groove portion
8 spherical outer peripheral surface
9 track groove
9a first track groove portion
9b second track groove portion
11 shaft
12 spherical outer peripheral surface
13 spherical inner peripheral surface
20 drive shaft
A end portion
B end portion
$f_2$ offset amount
K perpendicular line
L straight line
M plane including ball raceway center line
N joint axial line
O joint center
P plane including joint center
Q plane including ball raceway center line
$O_{o1}$ curvature center $O_{o3}$ curvature center
$O_{o4}$ curvature center
R straight line
X ball raceway center line
Y ball raceway center line
ΔT clearance between ball and track groove
ΔTai axial clearance
ΔTao axial clearance
ΔSo spherical clearance
ΔSi spherical clearance
ΔSia1 axial clearance
ΔSia2 axial clearance
γ inclination angle
β angle
θ operating angle

The invention claimed is:

1. A fixed type constant velocity universal joint, comprising:
an outer joint member having a spherical inner peripheral surface in which a plurality of track grooves are formed so as to extend in an axial direction of the outer joint member,
the outer joint member having an opening side and an interior side spaced apart from each other in the axial direction;
an inner joint member having a spherical outer peripheral surface in which a plurality of track grooves are formed so as to be paired with the plurality of track grooves of the outer joint member;
a plurality of balls for transmitting torque,
the plurality of balls being interposed between the plurality of track grooves of the outer joint member and the plurality of track grooves of the inner joint member; and
a cage comprising pockets for receiving the plurality of balls,
the cage having a spherical outer peripheral surface and a spherical inner peripheral surface, which are fitted to the spherical inner peripheral surface of the outer joint member and the spherical outer peripheral surface of the inner joint member, respectively,
wherein the plurality of track grooves of the outer joint member comprise:
first track groove portions positioned on the interior side; and
second track groove portions positioned on the opening side,
wherein each of the first track groove portions comprises an arc part having a curvature center that is positioned without being offset in the axial direction with respect to a joint center,
wherein the first track groove portions are inclined in a peripheral direction of the outer joint member with respect to a joint axial line and adjacent to each other in the peripheral direction with their inclination directions opposite to each other,
wherein each of the second track groove portions has a shape that is different from a shape of each of the first track groove portions,
wherein the first track groove portions and the second track groove portions are connected to each other at a position on the opening side with respect to the joint center,
wherein each of the plurality of track grooves of the inner joint member is formed so as to be mirror-image symmetrical with a corresponding one of the plurality of track grooves of the outer joint member with respect to a plane including the joint center and being perpendicular to the joint axial line at an operating angle of 0°,
wherein, at a neutral position under a non-load state at the operating angle of 0°, the outer joint member and the inner joint member being concentric with the joint axial line and centers of the plurality of balls lying in the plane, a first axial clearance at the opening side of the outer joint member and a second axial clearance at the interior side of the outer joint member are defined between the inner joint member and the cage, a third axial clearance is defined between each of the plurality of balls and a corresponding one of the plurality of track grooves of the outer joint member, and a fourth axial clearance is defined between each of the plurality of balls and a corresponding one of the plurality of track grooves of the inner joint member,
wherein the first axial clearance is defined as an axial distance within which the inner joint member is relatively displaceable in the axial direction with respect to the cage from the neutral position toward the opening side of the outer joint member, the second axial clearance is defined as an axial distance within which the inner joint member is relatively displaceable in the axial direction with respect to the cage from the neutral position toward the interior side of the outer joint member, the third axial clearance is defined as an axial distance within which each of the plurality of balls is relatively displaceable in the axial direction with respect to the outer joint member from the neutral position toward one side in the axial direction, and the fourth axial clearance is defined as an axial distance within which each of the plurality of balls is relatively displaceable in the axial direction with respect to the inner joint member from the neutral position toward the other side in the axial direction, and
wherein each of the first axial clearance and the second axial clearance is set to be larger than a sum of the third axial clearance and the fourth axial clearance.

2. The fixed type constant velocity universal joint according to claim 1, wherein an angle formed between a straight line, which passes through the joint center and a connection point between one of the first track groove portions and one of the second track groove portions, and the plane, which includes the joint center and is perpendicular to the joint axial line at the operating angle of 0° is set to 3° to 10°.

3. The fixed type constant velocity universal joint according to claim 2, wherein the curvature center of the arc part of each of the first track groove portions is arranged on the joint axial line.

4. The fixed type constant velocity universal joint according to claim 2, wherein the curvature center of the arc part of each of the first track groove portions is offset in a radial direction with respect to the joint axial line.

5. The fixed type constant velocity universal joint according to claim 2, wherein each of the second track groove portions comprises an arc part.

6. The fixed type constant velocity universal joint according to claim 2, wherein each of the second track groove portions comprises an arc part and the arc part of each of the second track groove portions has a curvature center offset to a radially outer side with respect to each of the first track groove portions and offset to the opening side with respect to the joint center.

7. The fixed type constant velocity universal joint according to claim 2, wherein each of the second track groove portions comprises a linear part, and the linear part is formed with an inclination so as to come closer to the joint axial line as a distance to the opening side becomes smaller.

8. The fixed type constant velocity universal joint according to claim 1, wherein the curvature center of the arc part of each of the first track groove portions is arranged on the joint axial line.

9. The fixed type constant velocity universal joint according to claim 1, wherein the curvature center of the arc part of each of the first track groove portions is offset in a radial direction with respect to the joint axial line.

10. The fixed type constant velocity universal joint according to claim 1, wherein each of the second track groove portions comprises an arc part.

11. The fixed type constant velocity universal joint according to claim 1, wherein each of the second track groove portions comprises an arc part and the arc part of the each of the second track groove portions has a curvature center offset to a radially outer side with respect to each of the first track groove portions and offset to the opening side with respect to the joint center.

12. The fixed type constant velocity universal joint according to claim 1, wherein each of the second track groove portions comprises a linear part, and the linear part is formed with an inclination so as to come closer to the joint axial line as a distance to the opening side becomes smaller.

\* \* \* \* \*